(12) United States Patent
Grobler et al.

(10) Patent No.: US 7,162,484 B2
(45) Date of Patent: Jan. 9, 2007

(54) METHOD AND SYSTEM FOR HIERARCHICAL VISIBILITY MARKS FOR HIERARCHICAL ELEMENTS IN HIERARCHICAL DATABASE STRUCTURE, FILTERING HIERARCHICAL ELEMENTS, HIDE ANY HIERARCHICAL ELEMENT NOT HAVING EITHER A USER HIERARCHICAL VISIBILITY MARK OR A PROPAGATED HIERARCHICAL VISIBILITY MARK

(75) Inventors: Dirk Grobler, Neumünster (DE); Ocke Janssen, Hamburg (DE); Frank Schoenheit, Glinde (DE)

(73) Assignee: Sun Microsystems, Inc., Santa Clara, CA (US)

( * ) Notice: Subject to any disclaimer, the term of this patent is extended or adjusted under 35 U.S.C. 154(b) by 327 days.

(21) Appl. No.: 10/261,978

(22) Filed: Sep. 30, 2002

(65) Prior Publication Data

US 2003/0065673 A1   Apr. 3, 2003

(30) Foreign Application Priority Data

Oct. 1, 2001   (EP) ................................ 01123606

(51) Int. Cl.
- *G06F 17/00* (2006.01)
- *G06F 17/30* (2006.01)
- *G06F 3/00* (2006.01)

(52) U.S. Cl. ........................ 707/102; 707/3; 707/104.1; 715/763; 715/968

(58) Field of Classification Search ................ 707/1–5, 707/10, 100–104.1, 200–202; 709/220–225; 345/813, 818, 819, 821, 822–823, 619–621, 345/419, 679; 702/181–182; 715/854, 514, 715/762–764, 837, 858, 967–968, 969, 808–810, 715/907; 717/105, 113, 109–110, 100, 123

See application file for complete search history.

(56) References Cited

U.S. PATENT DOCUMENTS

| | | | | |
|---|---|---|---|---|
| 5,388,196 A | * | 2/1995 | Pajak et al. | 715/751 |
| 5,428,737 A | * | 6/1995 | Li et al. | 707/4 |
| 5,467,471 A | * | 11/1995 | Bader | 707/1 |
| 5,675,752 A | * | 10/1997 | Scott et al. | 715/866 |
| 5,675,785 A | * | 10/1997 | Hall et al. | 707/102 |
| 5,724,577 A | * | 3/1998 | Exley et al. | 707/100 |
| 5,752,018 A | * | 5/1998 | Sheffield | 707/2 |

(Continued)

FOREIGN PATENT DOCUMENTS

EP           0560543 A2 *  3/1993

(Continued)

OTHER PUBLICATIONS

Susanta datta, visual data modeling in rational application developer 6.0: new data model features, Jan. 18, 2005, 11 pages.*

(Continued)

*Primary Examiner*—Srirama Channavajjala
(74) *Attorney, Agent, or Firm*—Gunnison, McKay & Hodgson, L.L.P.; Forrest Gunnison

(57) ABSTRACT

A new interface and methods allow a new versatility both in both managing a database, and in presenting hierarchical database information in a more useful way. User marks are used to determine the visibility of the elements at the various hierarchical levels in a hierarchical directory structure of a database. Hence, the user marks are user hierarchical visibility marks. The user hierarchical visibility marks are automatically propagated to other elements in the structure according to a filter selected by the user, for example.

22 Claims, 19 Drawing Sheets

U.S. PATENT DOCUMENTS

| | | | | |
|---|---|---|---|---|
| 5,774,128 | A | * | 6/1998 | Golshani et al. ............. 345/440 |
| 5,838,965 | A | * | 11/1998 | Kavanagh et al. ....... 707/103 R |
| 5,850,548 | A | * | 12/1998 | Williams ..................... 717/107 |
| 5,873,096 | A | * | 2/1999 | Lim et al. .................... 707/201 |
| 5,894,311 | A | * | 4/1999 | Jackson ....................... 345/440 |
| 5,907,704 | A | * | 5/1999 | Gudmundson et al. ..... 717/100 |
| 5,950,190 | A | * | 9/1999 | Yeager et al. .................... 707/3 |
| 5,983,237 | A | * | 11/1999 | Jain et al. ................. 707/104.1 |
| 6,049,803 | A | * | 4/2000 | Szalwinski .................. 707/100 |
| 6,121,969 | A | * | 9/2000 | Jain et al. .................... 715/850 |
| 6,131,100 | A | * | 10/2000 | Zellweger ................ 707/104.1 |
| 6,137,488 | A | * | 10/2000 | Kraft et al. .................. 715/866 |
| 6,141,658 | A | * | 10/2000 | Mehr et al. ...................... 707/7 |
| 6,175,837 | B1 | * | 1/2001 | Sharma et al. .......... 707/103 Y |
| 6,330,007 | B1 | * | 12/2001 | Isreal et al. ................. 715/762 |
| 6,339,777 | B1 | * | 1/2002 | Attaluri et al. ......... 707/103 R |
| 6,356,286 | B1 | * | 3/2002 | Lawrence ................... 715/853 |
| 6,433,797 | B1 | * | 8/2002 | Zellweger ................... 715/762 |
| 6,470,335 | B1 | * | 10/2002 | Marusak .......................... 707/4 |
| 6,490,581 | B1 | * | 12/2002 | Neshatfar et al. .............. 707/4 |
| 6,523,027 | B1 | * | 2/2003 | Underwood .................... 707/4 |
| 6,564,375 | B1 | * | 5/2003 | Jiang ............................ 717/165 |
| 6,598,042 | B1 | * | 7/2003 | Kienan ............................ 707/3 |
| 6,609,133 | B1 | * | 8/2003 | Ng et al. ................. 707/103 Y |
| 6,704,906 | B1 | * | 3/2004 | Yankovich et al. .......... 715/505 |
| 6,721,722 | B1 | * | 4/2004 | Turba ............................. 707/2 |
| 6,753,885 | B1 | * | 6/2004 | Stoakley et al. ............. 715/762 |
| 6,760,721 | B1 | * | 7/2004 | Chasen et al. .................. 707/3 |
| 6,839,715 | B1 | * | 1/2005 | Zander ........................ 707/102 |
| 6,918,083 | B1 | * | 7/2005 | Smith ........................... 715/511 |
| 6,978,269 | B1 | * | 12/2005 | Johnson et al. ............. 707/100 |
| 2001/0001851 | A1 | * | 5/2001 | Piety et al. .................. 702/184 |
| 2001/0003455 | A1 | * | 6/2001 | Grobler ....................... 345/418 |
| 2001/0052110 | A1 | * | 12/2001 | Orbanes et al. ................. 717/1 |
| 2002/0169788 | A1 | * | 11/2002 | Lee et al. ................. 707/104.1 |
| 2003/0055837 | A1 | * | 3/2003 | Brobst et al. ................ 707/102 |
| 2003/0095143 | A1 | * | 5/2003 | Lauris ......................... 345/762 |
| 2003/0140308 | A1 | * | 7/2003 | Murthy et al. .............. 715/500 |
| 2004/0128296 | A1 | * | 7/2004 | Krishnamurthy et al. ... 707/100 |
| 2005/0060647 | A1 | * | 3/2005 | Doan et al. .................. 715/514 |
| 2005/0132276 | A1 | * | 6/2005 | Panditharadhya et al. .. 715/513 |

FOREIGN PATENT DOCUMENTS

| | | | |
|---|---|---|---|
| EP | 0910024 A2 | * | 4/1999 |
| EP | 1302870 A2 | * | 4/2003 |
| EP | 1338979 A1 | * | 8/2003 |
| GB | 2284524 | * | 6/1995 |
| GB | 2402237 | * | 12/2004 |
| WO | WO 99/42942 | * | 8/1999 |
| WO | WO 01/67309 | * | 9/2001 |
| WO | WO 02/097671 | * | 12/2002 |
| WO | WO03/107321 | * | 12/2003 |

OTHER PUBLICATIONS

K. Vadaparty et al. towards a unified visual database access, Sigmod, 1993 ACM, pp. 357-366.*

Jarke J van Wijk et al. "cushion treemaps: visualization of hierarchical information", IEEE symposium on information visualization, Oct. 1999, pp. 1-6.*

Mariano P Consens et al. "Hy+: A Hygraph-based query and visualization system", SIGMOD, 1993 ACM, pp. 511-516.*

Chris Stolte et al. "Polaris: A system for query, analysis, and visualization of multidimensional relational databases", IEEE transaction on visualization and computer graphics, vol. 8, No. 1, Jan.-Mar. 2002 pp. 52-65.*

Rohit Mahajan et al. "visual and textual consistency checking tools for graphical user interfaces", IEEE transactions on softwar engineering, vol. 23, No. 11, Nov. 1997, pp. 722-735.*

Maria Cristina Ferreria de Oliveira et al. "from visual data exploration to visual data mining: A survey", IEEE transactions on visualization and computer graphiics, vol. 9, No. 3, Jul.-Sep. 2003, pp. 378-394.*

Andreas Dangberg et al. "generation of interactive visual environments for direct manipulation of database content" 2 pages.*

Philippe Salembier et al. "visual segment tree creation for MPEG-7 description schemes", 4 pages.*

Francesca Benzi et al. "VisTool: a visual tool for querying relational databases" 3 pages.*

Mike Nicewater, Power Designer Blueprint newsletter: "Data modeling layeers" issue 12, Dec. 200320 pages.*

Chien-Tsai Liu et al. "database schema evolution using EVER Diagrams", ACM 1994, pp. 123-132.*

Emanuel G. Noik, "challenges in graph-based relatinal data visualization",proceedings of the 1992 conference of the centre for advanced studies on collaborative research, IBM centre for advanced studies confernece, vol. 1, 1992, pp. 259-277.*

Yannis Ioannidis et al. "user-oriented visual layout at multiple granularities",proceeddings of the workshop on advanced visual interfaces, 1996, pp. 184-193.*

Ned Greene et al. "Hierarchical Z-buffer visibility", proceedings of the 20th annual conference on computer graphics and interactive techniques, 1993, pp. 231-238.*

Lidan Shou et al. "the hierarchical degree-of-visibility tree", Knowledge and data engineering, IEEE transactions on vol. 16, issue 11, Nov. 2004, pp. 1357-1369.*

Tanisi Pereira de Carvalho et al. "A visual query system implementing a temporal object-oriented model with roles on a relational database", IEEE 1997, pp. 38-47.*

Dudley,T, "A visual interface to a conceptual data modelling tool", Visual languages, 1989, IEEE workshop, pp. 30-37.*

Chris Stolte et al. "Query, analysis, and visualization of hierarchically structured data using Polaris", proceedings of the eight ACM SIGKDD international conference on knowledge discovery and data mining, 2002, pp. 112-122.*

* cited by examiner

METHOD AND SYSTEM FOR HIERARCHICAL VISIBILITY MARKS FOR HIERARCHICAL ELEMENTS IN HIERARCHICAL DATABASE STRUCTURE, FILTERING HIERARCHICAL ELEMENTS, HIDE ANY HIERARCHICAL ELEMENT NOT HAVING EITHER A USER HIERARCHICAL VISIBILITY MARK OR A PROPAGATED HIERARCHICAL VISIBILITY MARK

BACKGROUND OF THE INVENTION

1. Field of the Invention

This invention relates to database management systems, and more specifically relates to marking and selecting or filtering of elements in a database management system.

2. Description of Related Art

Computerized databases form a common tool used in connection with computers and networks. Application programs running on computers and network devices utilized databases, which were used to store, manage and retrieve data, especially tables. The application programs required suitable methods to maintain, retrieve and update the stored data. The stored data elements form the actual database where, in case of relational databases, the data entries are in the form of tables arranged in columns and rows.

A database management system (DBMS) was a tool for accessing, editing, storing and querying the database tables. The DBMS used relational algebra to logically connect the entries of the tables.

The user accessed tables of a database by means of the DBMS. The user accessed the tables to enter new data, delete old data, or generate relations between different tables in the database. The DBMS offered the user the option to process the data stored in different tables, e.g., the serial number of components required for a device along with the actual number of components in the stock, and to generate, for example, an order to the manufacturer of the components.

To access the tables in the DBMS, a front-end, a user interface, or a suitably defined data source, e.g. a terminal having a screen, a directory structure containing the tables was provided. In the directory structure, the tables were usually stored in hierarchic orders.

The hierarchic directories of conventional front-ends for a DBMS were structured in catalogs, schemas and tables, at least in tables. The presence of catalogs and schemas depended on the respective DBMS. Usually, a database administer provided access rights to the tables or selected tables for each particular user. In centralized network databases, the number of stored tables, structures, and catalogs was so large that the average user was not able to decide what data should be visible and what data should not be visible.

To select a certain table a user accessed a certain catalog, a certain schema in the catalog, and selected a certain table in this sub-structure. To simplify the access to selected tables, a user selected a filter option for the selected tables. The tables that satisfied the filter operation were displayed and those that did not were hidden. A filter suitable for use for the filter operation is described in U.S. Patent Application Publication No. US2001/0003455 A1, entitled "Method, System and Graphic User Interface for Entering and Editing Filter Conditions For Filtering a Database," of Dirk Grobler, published on Jun. 14, 2001 and assigned to Sun Microsystems, Inc.

In addition, some front-end programs of a DBMS offered the user the option to mark tables that were on the lowest hierarchic level. The marking was user-specific and so only the user who applied the marks saw the marks.

For example, FIG. 1A depicts a hierarchical directory structure of a conventional user interface of a front end of a database management system. The hierarchical directory structure has containers, e.g., catalog 102, and schemas 122, 124, 126, 128 and a plurality of tables including tables 122_2, 122_4, 122_6, 122_8, 124_2, 124_4, 124_6, 124_8, 126_2, 126_4, 126_6, 126_8, 128_2, 128_4, 128_6, and 128_8. In this example, catalogs were at the highest level of the hierarchical directory structure and tables were at the lowest level of the hierarchical directory structure.

In this example, catalog 102 contains a number N of schemas 122, 124, 126, 128, which are all illustrated. Only catalog 102 is depicted in the directory structure to simplify the figure. Other catalogs may be present but are not shown in this example. In this example, each schema 122, 124, 126, and 128 includes a different plurality of tables, i.e., schema 122 includes tables 122_2, 122_4, 122_6, 122_8; schema 124 includes tables 124_2, 124_4, 124_6, 124_8; schema 126 includes tables 126_2, 126_4, 126_6, 126_8; and schema 128 includes tables 128_2, 128_4, 128_6 and 128_8.

Each of tables 122_2, 122_4, 122_6, 122_8, 124_2, 124_4, 124_6, 124_8, 126_2, 126_4, 126_6, 126_8, 128_2, 128_4, 128_6, and 128_8 had a checkbox that permitted a user to mark the corresponding table. In FIG. 1B, a user has marked tables 122_2, 122_4, 122_6, 122_8, 126_2, 126_6, 128_6 and 128_8.

The front-end of the DBMS typically provided the user a filter to hide all unmarked tables 124_2, 124_4, 124_6, 124_8, 126_4, 126_6, 128_2 and 128_4 in the database hierarchical directory structure of FIG. 1B.

FIG. 1C depicts the hierarchical directory structure of FIG. 1A after the filter to hide all unmarked tables in FIG. 1B has been applied. The filter has filtered the hierarchical directory structure and has hidden all unmarked tables as illustrated in FIG. 1C.

While this mechanism allowed a user to display a hierarchical structure of interest to the user. The user markings could be applied only to the lowest level in the hierarchy. Also, since the markings were user specific, the display of FIG. 1C could not be viewed by another user.

These conventional user markings were static. This met, for example, that if the user-marked the tables as illustrated in FIG. 1B and saved the corresponding filter with those marking, when another user added a new table to schema 122, in which the user wanted to see all tables, the newly entered table was not shown because the new table was not marked by the user. With this method, the marks are static and any newly generated and unmarked tables are hidden and therefore cannot be displayed to the user.

SUMMARY OF THE INVENTION

In one embodiment of the present invention, a user is presented a computer-based graphic user interface that includes a database hierarchical structure. The structure includes at least a container having a mechanism for marking the container with a user hierarchical visibility mark, and at least one child element of the container. The child element also has a mechanism for marking the child element with a user hierarchical visibility mark.

A method associated with the graphic user interface receives user hierarchical visibility marks for elements in the database hierarchical structure. The method propagates automatically hierarchical visibility marks to other elements in the database hierarchical structure using the user hierarchical visibility marks for the elements so that the other elements have propagated hierarchical visibility marks. The method also filters the elements in the database hierarchical structure to hide any element not having either a user hierarchical visibility mark or a propagated hierarchical visibility mark.

In one embodiment, a propagate markings module and a filter visible elements module are stored in a memory. In another embodiment, computer readable instructions for the propagate markings module and the filter visible elements module are stored on a computer program product.

In one embodiment, these modules are executed on a processor to implement the propagating and filtering operations. Hence, the propagating and filtering operations are performed on a server system, or alternatively on a stand-alone computer system.

An embodiment of the propagating automatically hierarchical visibility marks of the method includes propagating automatically hierarchical visibility marks to child elements contained in a container element having a user hierarchical visibility mark. In one instance, the child elements are in a lowest hierarchical level of the database hierarchical structure. In another embodiment, the propagating automatically hierarchical visibility marks of the method further includes propagating automatically a hierarchical visibility mark to a parent element of the container element. In still yet another embodiment, the propagating automatically hierarchical visibility marks further includes generating a user-marking indicator for a container element having at least one child element having a user hierarchical visibility mark.

Another method for marking data elements in a database management system includes in one embodiment, receiving a request for transmission of database data;
retrieving the requested data;
transferring the requested data for display;
receiving user hierarchical visibility marks for the requested data; and
storing the user hierarchical visibility marks.

A method for selecting data in a database includes in one embodiment, retrieving database data;
retrieving stored user hierarchical visibility marks for the database data; and
filtering the database data using the user hierarchical visibility marks to select certain data out of the database data; and In still another embodiment of this invention, a computer system includes means for receiving user hierarchical visibility marks for elements in a database hierarchical structure; and means for propagating automatically hierarchical visibility marks to other elements in the database hierarchical structure using the user hierarchical visibility marks for the elements so that the other elements have propagated hierarchical visibility marks. The computer system also includes means for filtering elements in the database hierarchical structure to hide any element not having either a user hierarchical visibility mark or a propagated hierarchical visibility mark.

According to yet another embodiment of the present invention a software tool for enabling a user to mark hierarchical elements in a database is provided. The software tool includes program portions for carrying out the operations of the aforementioned related methods to mark hierarchical elements, preferably in a database stored in a server when the software tool is implemented e.g. in a server computer program. The software tool for enabling a user to mark hierarchical elements in a database, including program code portions may be implemented in a computer device or client device computer program.

Yet, another embodiment of the present invention is a computer program for enabling a user to mark hierarchical elements in a database. The computer program includes program code means for carrying out the operations of the related aforementioned methods to mark hierarchical elements in a database when the program is executed.

According to another embodiment of the present invention, a computer program product is provided which includes program code means stored on a computer readable medium for carrying out the aforementioned related methods when the program product is run on a server or on a computer or client device. In yet another embodiment, a computer-program product comprising a medium configured to store or transport computer readable code for a method or methods described herein.

In another embodiment of the invention does not only include hierarchical visibility marks for filter options, but also includes user-marks for the user so that the user can mark, for example, the individual importance of a table or a container for the user himself. The individual user-marks can be implemented as an additional feature of the front-end of the DBMS.

The method further includes a user identification operation, and the access to the markings is only granted to an identified user or users. User identification allows use of the various methods in a network, where each user can access and retrieve his personal set of markings. The user identification can be, for example, the standard user identification operation with a password for a computer, network, or database access.

BRIEF DESCRIPTION OF THE DRAWINGS

In the Figures and the following Detailed Description, elements with the same reference numeral are the same or similar elements. Also, the first digit of a reference numeral is the figure number in which the element having that reference number first appears.

DETAILED DESCRIPTION

In one embodiment of the present invention, a new interface and methods allow a new versatility both in both managing a database, and in presenting hierarchical database information in a more useful way. Unlike the prior art system that allowed user marking of only elements in the lowest level of the hierarchy, in one embodiment, elements at any level of hierarchy 200 (FIG. 2A) can be marked by a user. As explained more completely below, user marks (FIG. 2B) are used to determine the visibility of the elements at the various hierarchical levels in a hierarchical directory structure of a database, sometimes called database hierarchical directory structure. Hence, the user marks are user hierarchical visibility marks.

In one embodiment as explained more completely below, a user hierarchical visibility mark of an element in a higher hierarchical level makes visible all elements in a lower hierarchical level extending from that element irrespective of whether these lower hierarchical level elements have been marked by the user. The user hierarchical visibility mark for the element in the higher hierarchical level automatically is propagated to all elements in the next lower hierarchical level extending from the user-marked element, i.e., propagated to the children of that element. This is particularly helpful when new lower hierarchical level elements have been added to the database. Unlike the prior art, these new lower hierarchical level elements are visible even when the new elements have not been marked by any user.

In yet another embodiment as explained more completely below, to provide even more information, the user hierarchical visibility marks are used to automatically propagate hierarchical visibility marks to other elements in the hierarchy. This further assists in generating an understandable and usable visual representation of the database hierarchical directory structure.

In still another embodiment as explained more completely below, the user hierarchical visibility marks along with information such as identification of the database elements associated with the marks and an indication of the user are stored as hierarchical visibility markings. Any user with appropriate authorization can access the stored hierarchical visibility markings and retrieve a subset of the elements in the database as defined by the marks and a selected filter. Hence, in this embodiment, the user hierarchical visibility marks are not restricted to use by the user that initially made the selection, i.e., the marks are not required to be user-specific.

Figure 1A:
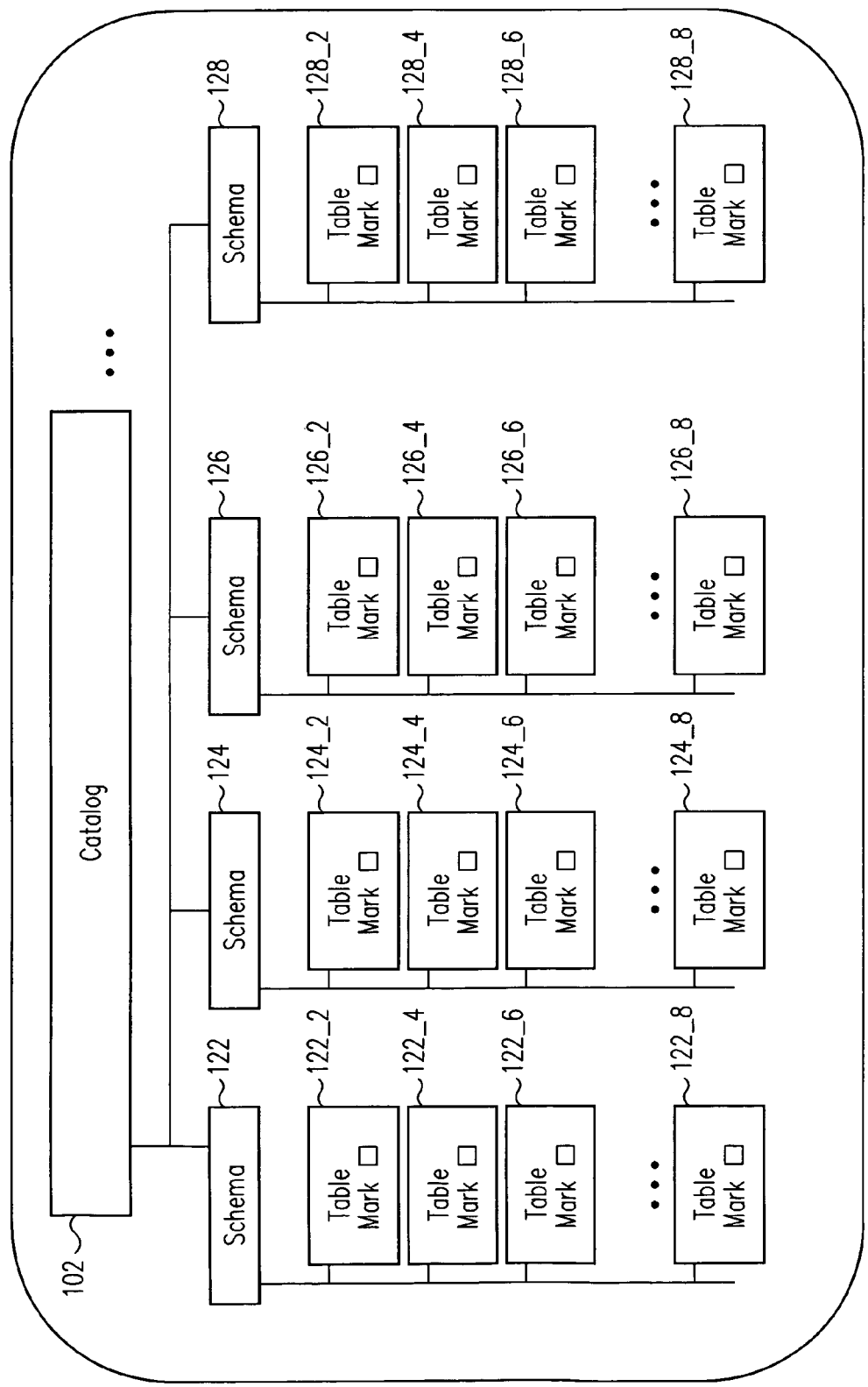
FIG. 1A is an example of a prior art display of a database hierarchical directory structure that permitted static user marking only at the lowest level of the hierarchical structure.
Figure 1B:
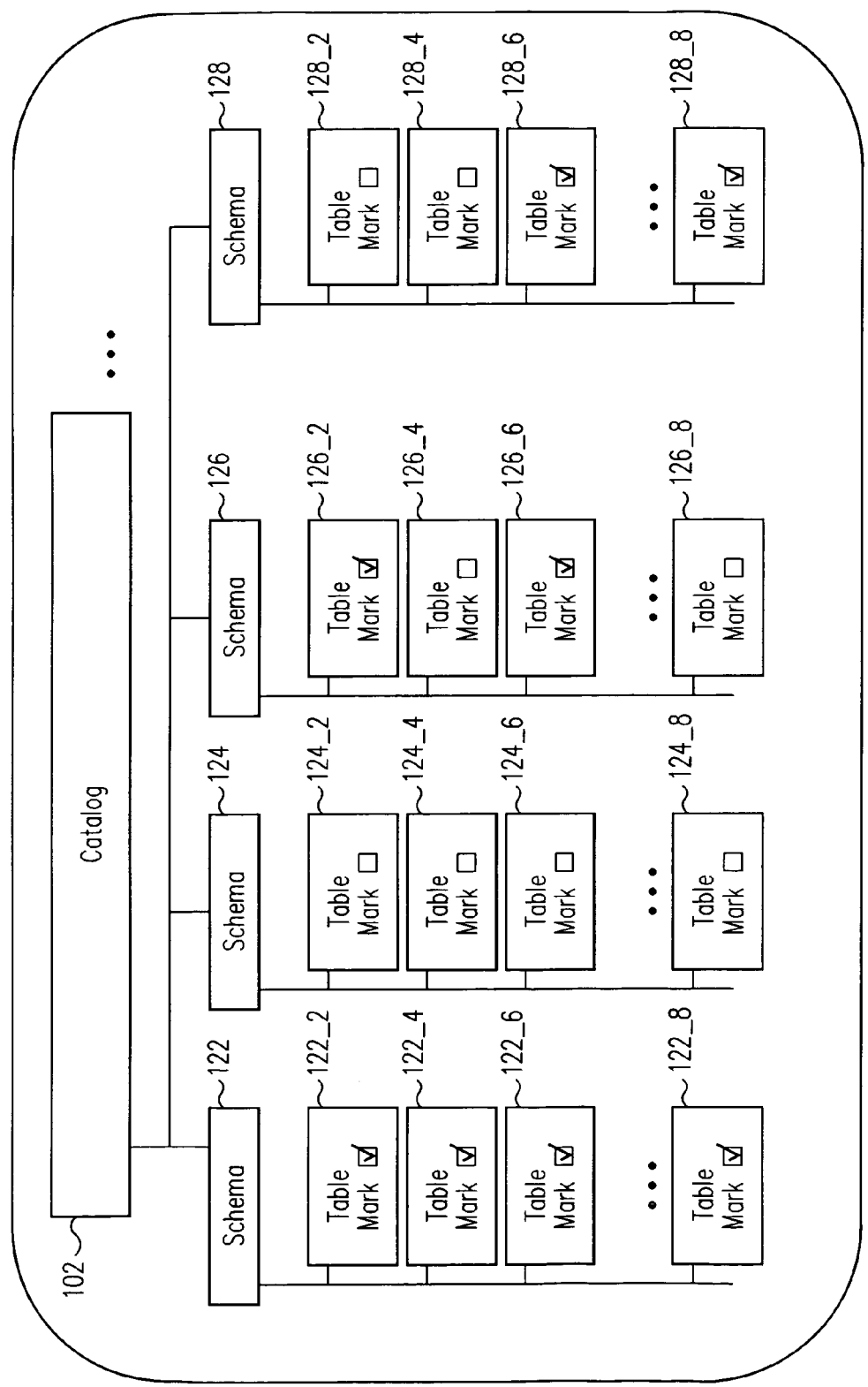
FIG. 1B is the prior art display of FIG. 1A after a user has marked selected tables at the lowest level of the hierarchical structure.
Figure 1C:
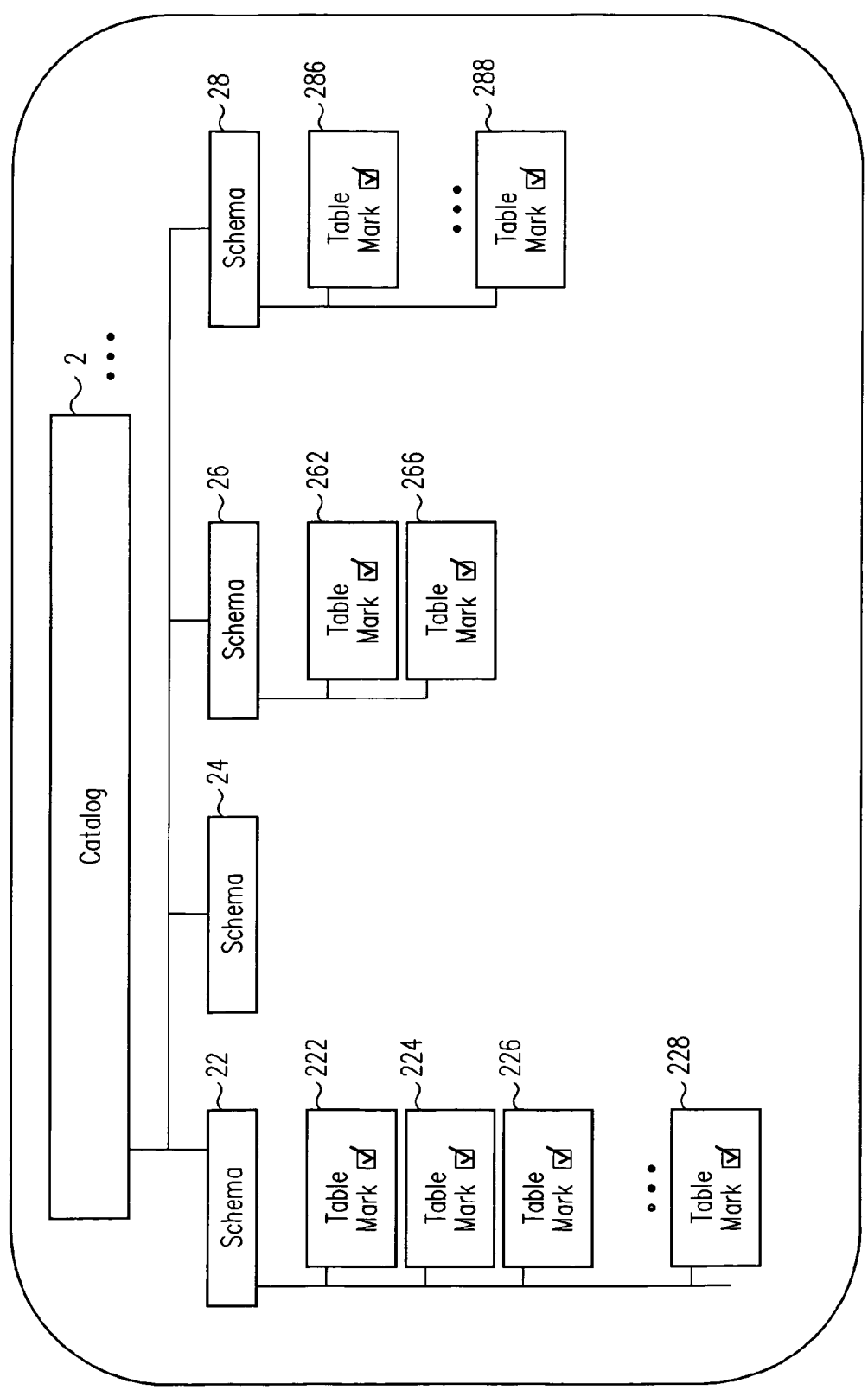
FIG. 1C is an example of the database hierarchical directory structure after a filter was used to hide all the unmarked tables in FIG. 1B.
Figure 2A:
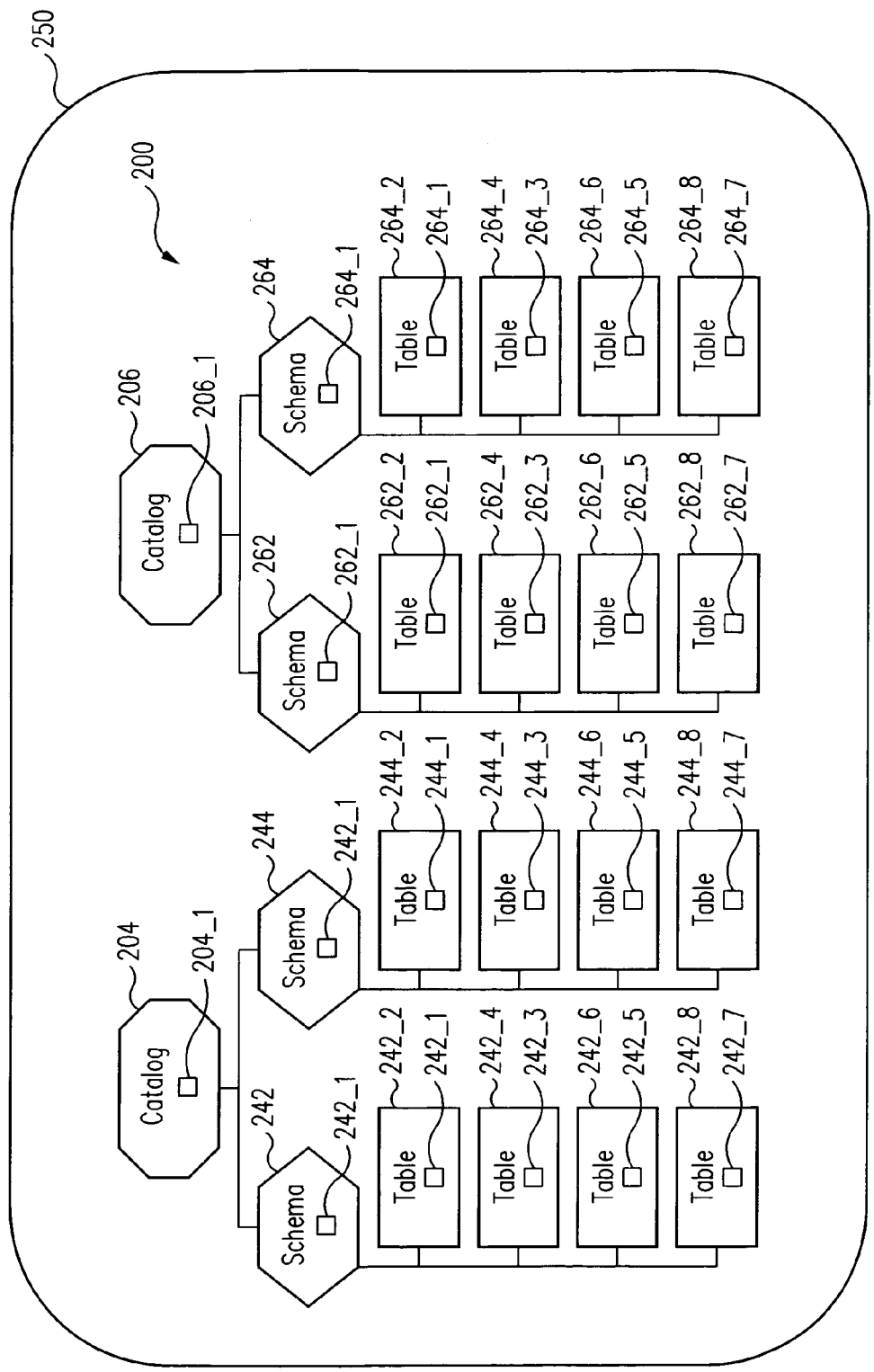
FIG. 2A is an example of a graphic user interface that includes a database hierarchical structure with container elements, sub-container elements, and table elements with each element having a mechanism for marking the element with a user hierarchical visibility mark according to one embodiment of the invention.

FIG. 2A depicts a display 250 of a database hierarchical directory structure 200 according to an embodiment of the present invention. Display 250 can be associated with any type of display device, e.g., a monitor, printer, etc. Database hierarchical directory structure 200 includes catalogs 204, 206, schemas 242, 244, 262, 264 and a plurality of tables including tables 242_2, 242_4, 242_6, 242_8, 244_2, 244_4, 244_6, 244_8, 262_2, 262_4, 262_6, 262_8, 264_2, 264_4, 264_6, and 264_8.

In this example, catalogs are at the highest level of database hierarchical directory structure 200 and tables are at the lowest level of database hierarchical structure 200. Catalogs 204, 206, schemas 242, 244, 262, 264 are containers. Within a given hierarchical level, the items on that level are referred to as elements. A catalog is a parent of schemas, and the schemas are children of the catalog. Similarly, a schema is a parent of tables, and the tables are children of the schema. The parent-child relationship is one way for denoting the hierarchical relationship of the elements.

In this embodiment, each element in database hierarchical directory structure 200 includes a checkbox. Specifically, check box 204_1 of catalog 204, check box 206_1 of catalog 206, check box 242_1 of schema 242, check box 244_1 of schema 244, check box 262_1 of schema 262, check box 264_1 of schema 264, checkbox 242_1 of table 242_2, checkbox 242_3 of table 242_4, checkbox 242_5 of table 242_6, checkbox 242_7 of table 242_8, checkbox 244_1 of table 244_2, checkbox 244_3 of table 244_4, checkbox 244_5 of table 244_6, checkbox 244_7 of table 244_8, checkbox 262_1 of table 262_2, checkbox 262_3 of table 262_4, checkbox 262_5 of table 262_6, checkbox 262_7 of table 262_8, checkbox 264_1 of table 264_2, checkbox 264_3 of table 264_4, checkbox 264_5 of table 264_6, and checkbox 264_7 of table 264_8.

A user can mark any desired combination of the checkboxes including the checkboxes in the catalogs and schemas. When a user places a mark in a check box, the corresponding element is said to have a user hierarchical visibility mark. An element that does not have a mark in the check box does not have a user hierarchical visibility mark. Thus, in this embodiment, the check box is a mechanism for marking an element with a user hierarchical visibility mark.

When a user places a mark in a check box, the corresponding element in display 250 is marked by highlighting the element, e.g., displayed in bold, so long as the mark remains in the checkbox. This enables the user to perceive the user-marked elements in database hierarchical directory structure 200 on the catalog, schema and table levels.

Figure 2B:
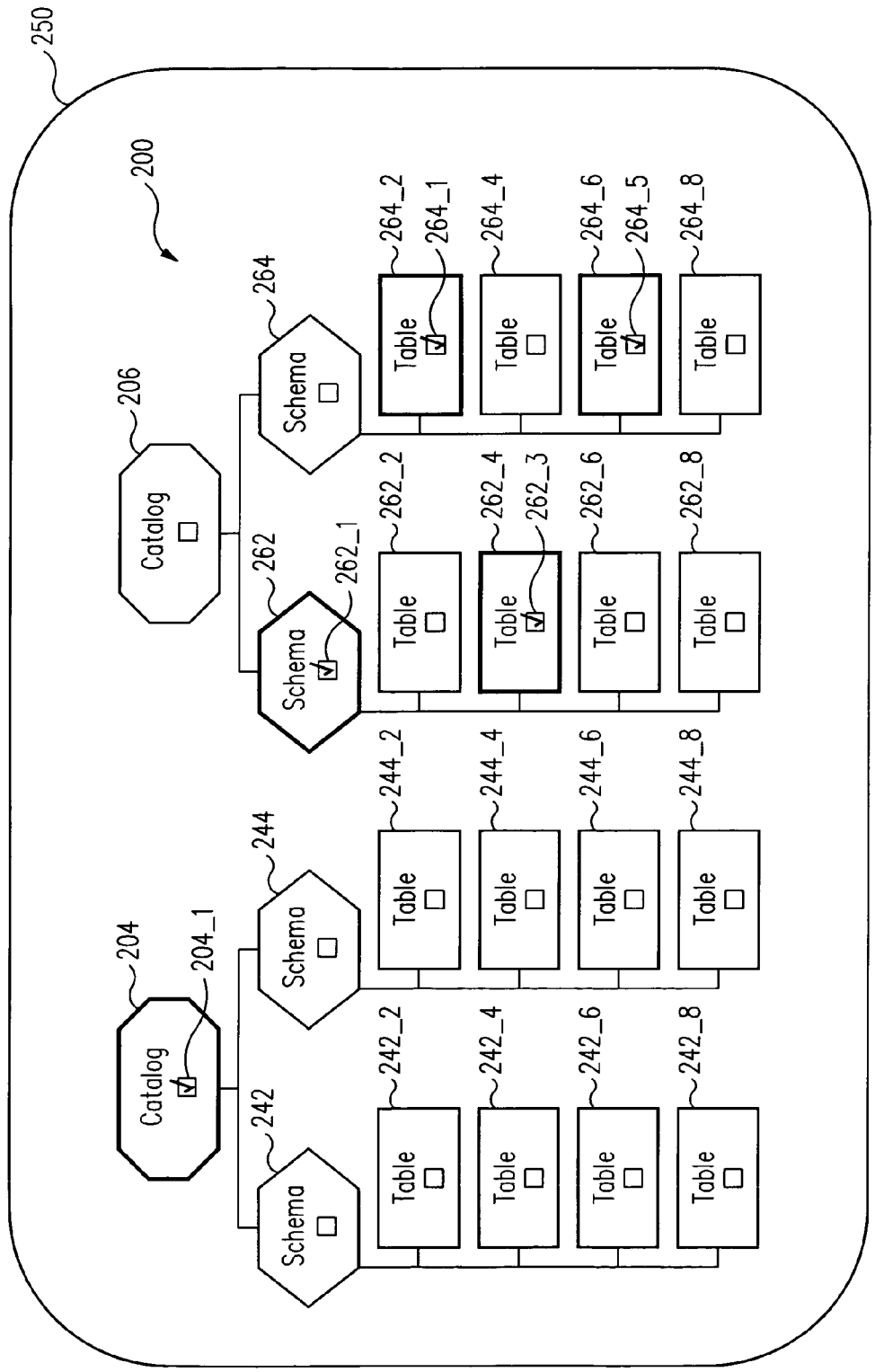
FIG. 2B is an illustration of the graphic user interface of FIG. 2A after a user has processed selected elements so that those elements each have a user hierarchical visibility mark according to one embodiment of the invention.

For example, in FIG. 2B, a user has marked checkbox 204_1 in catalog 204, checkbox 262_1 in schema 262, checkbox 262_3 of table 262_4, checkbox 264_1 of table 264_2 and checkbox 264_5 of table 264_6. Hence, catalog 204, schema 262, table 262_4, table 264_2 and table 264_6 are displayed in bold.

In this example, database hierarchical directory structure 200 includes two types of elements, tables and containers. The tables and/or containers are stored in containers or sub-containers.

The user can arbitrarily select which containers, sub-containers and tables of a database hierarchical directory structure are visible by applying user hierarchical visibility marks, in this embodiment of the invention, and then selecting a filter to process the marked structure.

While in the embodiment of FIG. 2B, the user marks a check box and the corresponding element is marked by highlighting the element, e.g., making the outline of the element bold. The highlighting can be for example, a bold, colored, transparent, oblique, and/or dotted depiction of element. In place of marking a check box, the user marking of an element can be executed, for example, by a menu, by key input and the like, each of which is a mechanism for marking an element with a user visibility hierarchical mark.

According to one embodiment of the invention, the user has access to several different filters that (a) propagate hierarchical visibility marks based upon the user hierarchical visibility marks to enhance the resulting user interface to the database; and (b) filter the database hierarchical directory structure based upon the user hierarchical visibility marks and the propagated hierarchical visibility marks. The available filters can be presented to the user via menu selections, buttons, or any other convenient method for a particular user interface.

Figure 3A:
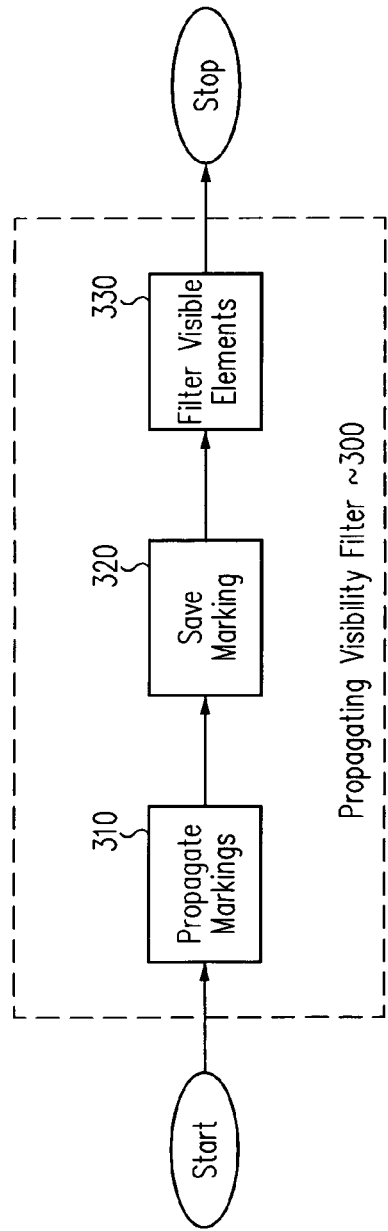
FIG. 3A is a first embodiment of a propagating visibility filter according to the present invention.

FIG. 3A is a process flow diagram for a propagating visibility filter 300 according to one embodiment of the invention. Propagate markings operation 310 analyzes the location of a user-marked element and propagates hierarchical visibility marks to an element or elements at another hierarchical level or at other hierarchical levels. Hence, according to this embodiment of the invention, the hierarchical visibility marks include user hierarchical visibility marks and automatically propagated hierarchical visibility marks based upon the user hierarchical visibility marks.

In this embodiment, operation 310 propagates marks to child elements, or to parent and child elements. However, operation 310 does not propagate marks to other elements on the same hierarchical level as the user-marked element. As explained more completely below, various embodiments of filter 300 are defined by automatically propagating the user hierarchical visibility marks in different ways.

Propagate markings operation 310 transfers processing to save markings operation 320. Save markings operation 320 saves at least the user hierarchical visibility marks, and information to identify the elements of the database associated with the marks. Herein, the data saved is referred to as hierarchical visibility markings.

As explained more completely below, the hierarchical visibility markings are saved in one embodiment in the same memory that includes the database and in another embodiment in a separate marking memory. Save markings operation 320 transfers processing to filter visible elements operation 330.

Filter visible elements operation 330 processes the database hierarchical directory structure and if an element in the structure does not have a hierarchical visibility mark, i.e., either a user hierarchical visibility mark or a propagated hierarchical visibility mark, that element is hidden. Thus, the hierarchical visibility mark for each element in the hierarchical structure functions as a flag. When the element has a hierarchical visibility mark, the flag is asserted and the element remains visible. When the element does not have a hierarchical visibility mark, the flag is deasserted and the element is hidden. The output from filter 300 typically is sent to a display device for display to the user.

Figure 3B:
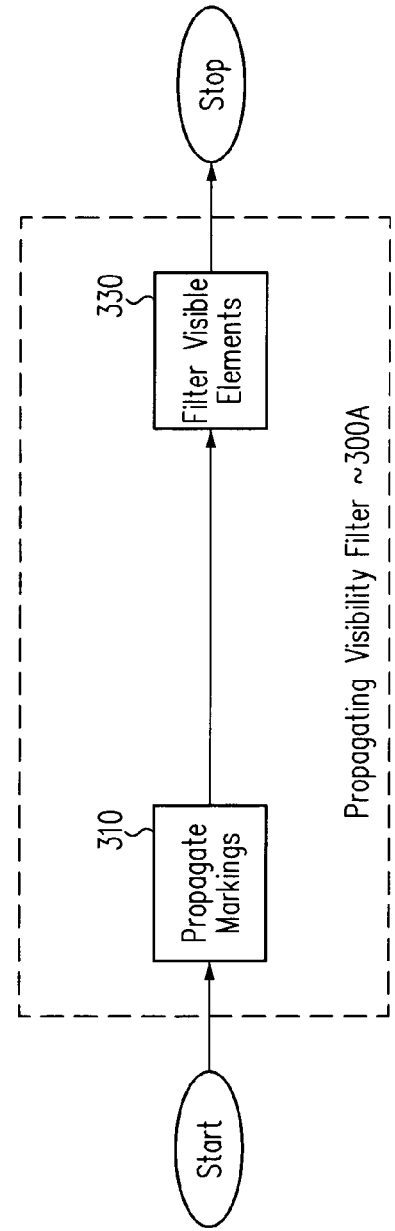
FIG. 3B is a second embodiment of a propagating visibility filter according to the present invention.

Filter 300A (FIG. 3B) is the same as filter 300 in FIG. 3A, except module 320 has been eliminated. Thus, in the following process flow diagrams of FIGS. 4A, 5A, and 6A, equivalent process flow diagrams can be obtained for filter 300A by eliminating the save markings module from those figures.

In both filters 300 and 300A, as well as the various embodiments described below, execution of the propagate markings module is a means for propagating marks. Similarly, execution of the filter visible elements module is means for filtering visible elements.

Figure 4A:
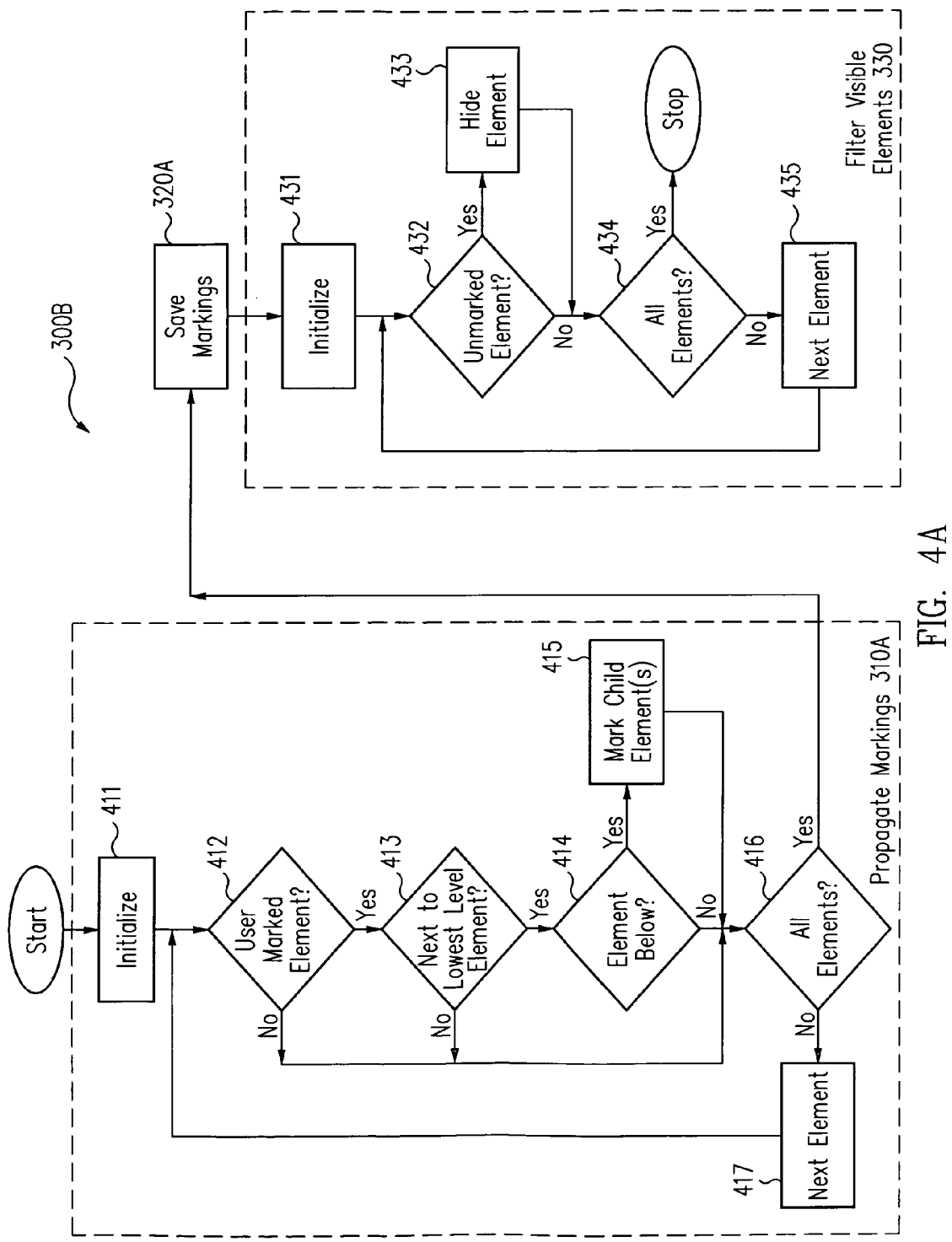
FIG. 4A is a process flow diagram for another embodiment of the propagating visibility filter of the present invention.

FIG. 4A is a process flow diagram for a hierarchical-hide-unmarked-elements filter 300B. For database hierarchical directory structure 200, filter 300B propagates a user-marked schema to the tables forming the lower hierarchical level extending from the user-marked schema, i.e., propagates to any children of the schema. In more general terms, hierarchical-hide-unmarked-elements filter 300B automatically propagates a user hierarchical visibility mark of an element at a first hierarchical level to all elements at a second hierarchical level where the second hierarchical level is lower than the first hierarchical level and extends from the first hierarchical level, i.e., automatically propagates a user hierarchical visibility mark of a parent element to the child elements of that parent.

While in this example, the two hierarchical levels on which filter 300B operates are the lowest and next-to-lowest hierarchical levels, this filter is not limited to these hierarchical levels. One purpose of the filter is to permit a user to see to new elements that are subsequently added to the hierarchical level immediately below the level of the marked element. Consequently, if element additions to a hierarchical level other than the lowest hierarchical level are of interest in a more complex database hierarchical directory structure, this filter is easily adapted to accommodate other levels by allowing the user to specify the two hierarchical levels on which the filter operates.

In this example, the user has marked the elements as illustrated in FIG. 2B and has selected hierarchical-hide-unmarked-elements filter 300B. Hence, in initialize operation 411, database hierarchical directory structure 200 is ordered for processing and a current element is initialized. Depending upon the implementation, all of the elements in hierarchical structure can be processed, or alternatively if only selected elements must be processed to accomplish the desired propagation of marks only those elements are queued for processing in initialization operation 411. In this example, each of the elements is considered to demonstrate more clearly how the filter works. Initialize operation 411 transfers processing to user-marked element check operation 412.

User-marked element check operation 412 determines whether the current element has a user hierarchical visibility mark. If the current element has a user hierarchical visibility mark, check operation 412 transfers to next-to-lowest level element check operation 413 and otherwise transfers to all elements check operation 416. For example, if the current element were element 204 (FIG. 2B), element 204 has a user hierarchical visibility mark and so processing would transfer from check operation 412 to next-to-lowest level element check operation 413. Conversely if the current element were element 206, element 206 does not have a user hierarchical visibility mark and so check operation 412 would transfer to check operation 416 that is described below.

Next-to-lowest level check operation 413 determines whether the current user-marked element is in the hierarchical level that is next-to-the-lowest-hierarchical level. If the current user-marked element is in the hierarchical level that is next-to-the-lowest-hierarchical level, check operation 413 transfers to element below check operation 414 and otherwise transfers to all elements check operation 416.

If the current element were user-marked element 204, next-to-lowest level element check operation 413 would transfer to all elements check operation 416, because element 204 is not in the hierarchical level next to the lowest hierarchical level. Conversely, if the current element were user-marked element 262, user-marked element 262 is in the hierarchical level next to the lowest hierarchical level and so processing would transfer to element below check operation 414. Herein, a user-marked element has a user hierarchical visibility mark.

Element below check operation 414 determines whether there are any elements in the hierarchical level extending from the current user-marked element. If there is at least one element in the hierarchical level extending from the current user-marked element, check operation 414 transfers to mark child element(s) operation 415 and otherwise to all elements check operation 416. If the current element were user-marked element 262, there is at least one table in the hierarchical level extending from element 262 and so processing would transfer to mark child element(s) operation 415.

In operation 415, each element in the lower hierarchical level extending from the user-marked element in the next higher hierarchical level is marked so that the element is visible, i.e., the element has a propagated hierarchical visibility mark. Upon completion, operation 415 transfers to check operation 416. When element 262 is the current element, operation 415 marks tables 262_2, 262_4, 262_6 and 262_8 as visible. Notice that table 262_4 is already marked as visible in view of the user hierarchical visibility mark. In one embodiment, a non-container element can have both a user hierarchical visibility mark and a propagated hierarchical visibility mark.

All elements check operation 416 determines whether all elements in the database hierarchical directory structure have been processed. If at least one element remains to be processed by operation 310A, check operation 416 transfers to next element operation 417 and otherwise to save markings operation 320A. Next element operation 417 sets the current element to the next element in the hierarchical directory structure that requires processing and returns to check operation 412.

In view of this disclosure, optimizations to filter 300B could be made for specific embodiments. For example, for the embodiment of FIG. 2B, it is only necessary to check schema 242, 244, 262, and 264 for user marks and so operation 412 would be limited to checking on the second hierarchical level for elements with user hierarchical visibility marks and so check operation 413 could be eliminated. In general, if check operation 412 is made hierarchical level specific, check operation 413 can be eliminated. Hence, operation 310A is illustrative only and is not intended to limit the invention to this specific embodiment.

In this embodiment, save marking operation 320A saves the user hierarchical visibility marks as described above. Optionally, operation 320A may save information about the filter selected by the user. Operation 320A transfers processing to filter visible elements operation 330.

In this embodiment operations 431 to 435 process each element in database hierarchical directory structure 200 and hide each element that is not marked as visible, i.e., hide each element that does not have either a user hierarchical visibility mark or a propagated hierarchical visibility mark. In other embodiments, operations 330 and 310A could be combined to accomplish the same result and to eliminate redundant operations.

Figure 4B:
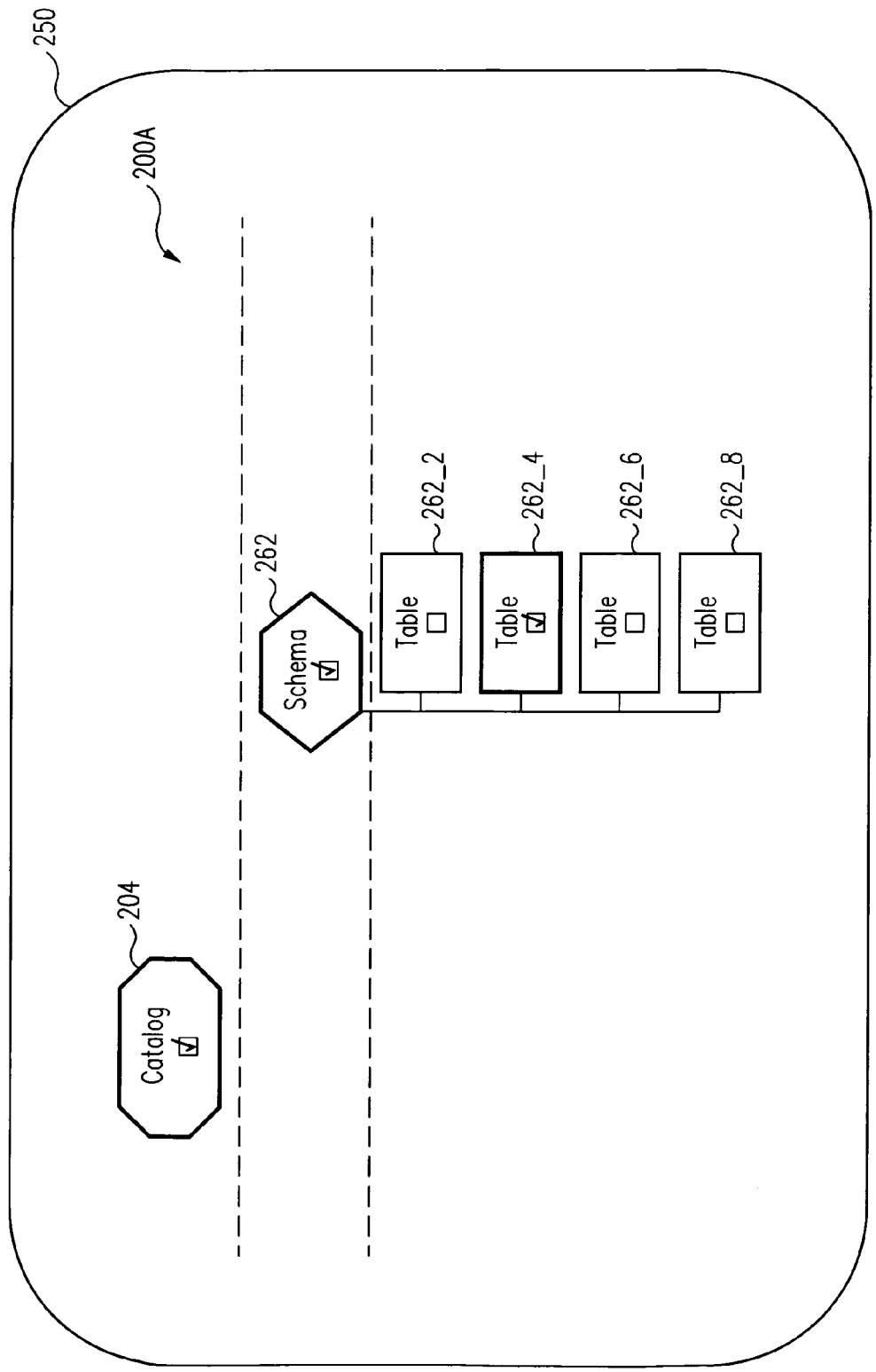
FIG. 4B is an illustration of a graphic user interface after the filter of FIG. 4A is applied to the data of FIG. 2B according to one embodiment of the present invention.
Figure 5A:
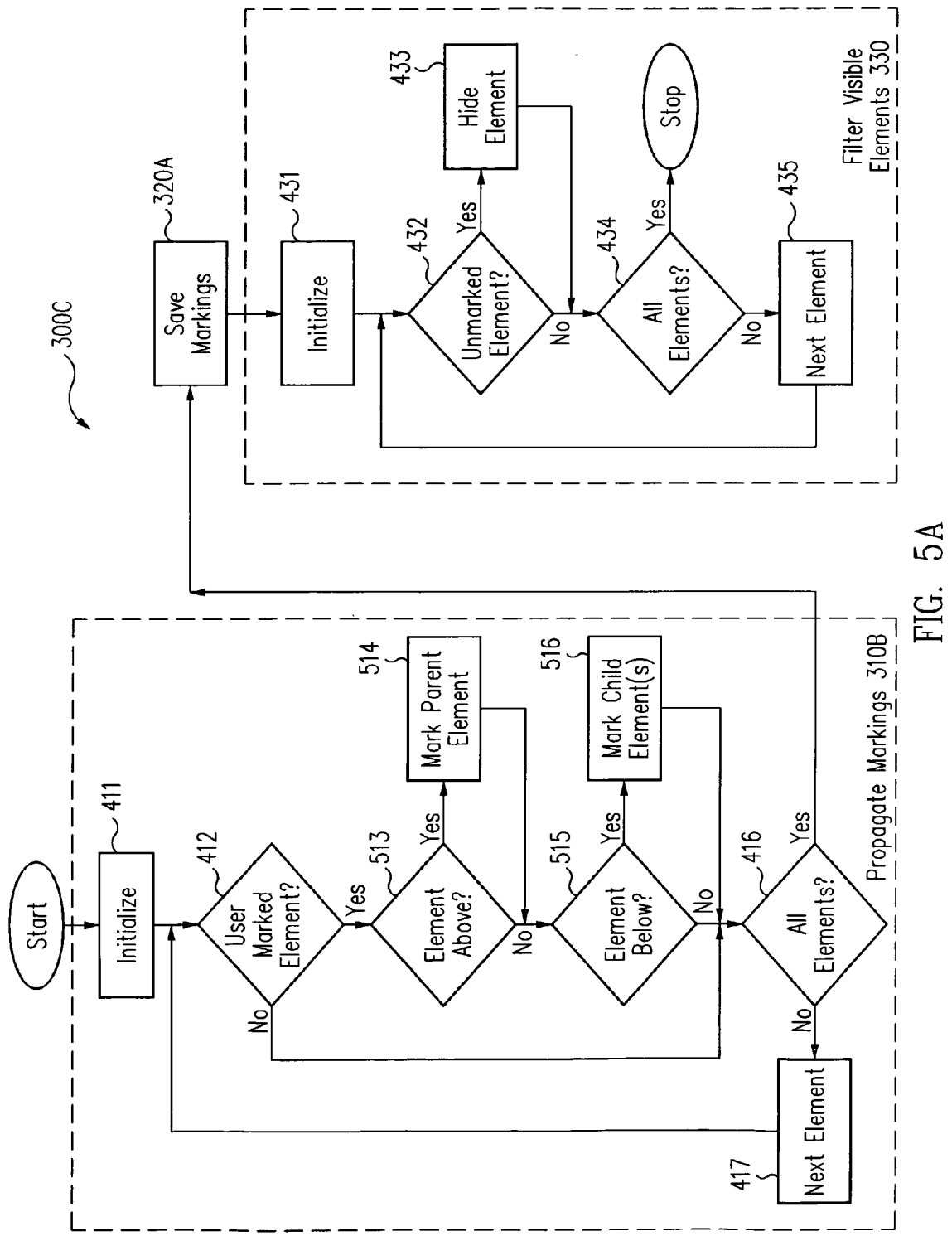
FIG. 5A is a process flow diagram for yet another embodiment of the propagating visibility filter of the present invention.

The result of applying hierarchical hide unmarked elements filter 300B to structure 200 (FIG. 2B) is structure 200A of FIG. 4B. The effect of filter 300B is that all tables beneath an unmarked schema are not displayed. All tables beneath a user-marked schema are displayed without any filtering thereof. Schemas and catalogs are only shown if user-marked. Thus, if the user marks an element on the schema level, new tables below that user-marked element stay visible. So, if a new table is added to schema 262, the user can see and access the new unmarked table even with an activated filter FIG. 5A is a process flow diagram for a hide-unmarked elements and display limited hierarchical structure filter 300C. For database hierarchical directory structure 200, filter 300C automatically propagates a user hierarchical visibility marking for an element in one hierarchical level to an element in the next highest hierarchical level from which the marked element extends and to any elements in the next lowest hierarchical level extending from the marked element. Filter 300C retains the functionality of filter 300B, while at the same time providing a limited presentation of the hierarchical structure about each user-marked element.

In this example, the user has marked the elements as illustrated in FIG. 2B and has selected hide-unmarked elements and display limited hierarchical structure filter 300C (FIG. 5A). Initialize operation 411 and user-marked element check operation 412 are equivalent to those described for filter 300B (FIG. 4A) and that description is incorporated herein by reference.

However, in this embodiment, if the current element has a user hierarchical visibility mark, check operation 412 transfers to element above check operation 513 and otherwise transfers to all elements check operation 416. For example, if the current element were element 204 (FIG. 2B), element 204 has a user hierarchical visibility mark and so processing would transfer from check operation 412 to element above check operation 513. Conversely if the current element were element 206, element 206 does not have a user hierarchical visibility mark and so check operation 412 would transfer to check operation 416.

Element above check operation 513 determines whether the current user-marked element is in a hierarchical level that extends from an element in a next higher hierarchical level, i.e., whether the current user-marked element is a child element If the current user-marked element is in the hierarchical level that extends from an element in a next higher hierarchical level, check operation 513 transfers to mark parent element operation 514 and otherwise transfers to element below check operation 515.

If the current element were user-marked element 204, element above check operation 513 would transfer to element below check operation 515, because element 204 is not in a hierarchical level that extends from an element in a next higher hierarchical level. Conversely, if the current element were user-marked element 262, user-marked element 262 is a hierarchical level that extends from element 206 in the next higher hierarchical level and so processing would transfer to mark parent element operation 514.

In mark parent element operation 514, the element in the next higher hierarchical level from which the user-marked element extends is marked so that the element is visible, i.e., the user hierarchical visibility mark is propagated to the element so that the element has a propagated hierarchical visibility mark. Hence, for user-marked element 262, operation 514 marks element 206 so that element 206 is visible. Upon completion, mark parent element operation 514 transfers processing to element below check operation 515.

Element below check operation 515 determines whether there are any elements in the hierarchical level extending from the current user-marked element i.e., is there a child element of the current user-marked element. If there is at least one element in the hierarchical level extending from the current user-marked element, check operation 515 transfers to mark child element(s) operation 516 and otherwise to all elements check operation 416.

If the current element were user-marked element 262, there is at least one element in the hierarchical level extending from element 262 and so processing would transfer to mark child element(s) operation 516. Similarly, if the current element were user-marked element 204, there is at least one element in the hierarchical level extending from element 204 and so processing would transfer to mark child element(s) operation 516. Conversely, if the current element were user-marked element 262_4, there is not at least one element in a hierarchical level extending from element 262_4, and so processing would transfer to all elements check operation 416.

In operation 516, each element in the lower hierarchical level extending from the user-marked element in the next higher hierarchical level is marked so that the element is visible, i.e., the user hierarchical visibility mark is propagated to the element so that the element has a propagated hierarchical visibility mark. Upon completion, operation 516 transfers to check operation 416.

When element 262 is the current element, operation 516 marks tables 262_2, 262_4, 262_6 and 262_8 as visible. When element 204 is the current element, operation 516 marks schema 242 and 244 as visible. Note that by checking element 204, the user is able to determine when a new schema is added to element 204 by using this filter with the user hierarchical visibility marks of FIG. 2B.

All elements check operation 416 and next element operation 417 operate as described above and that description is incorporated herein by reference. Also, operations 320A and 330 are equivalent to those described above and that description is incorporated herein by reference.

Figure 5B:
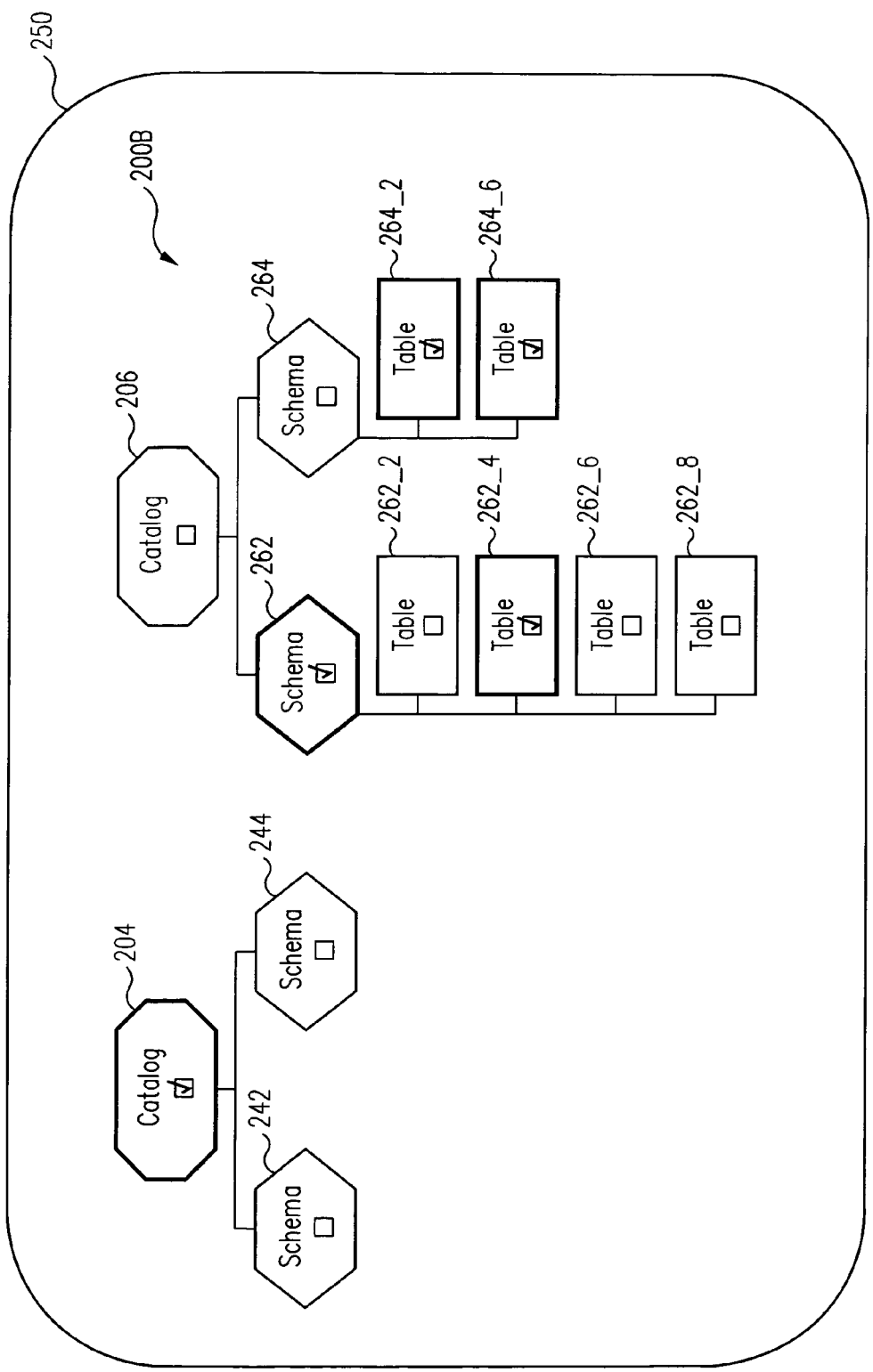
FIG. 5B is an illustration of a graphic user interface after the filter of FIG. 5A is applied to the data of FIG. 2B according to one embodiment of the present invention.

FIG. 5B illustrates a hierarchical table structure 200B that is obtained by applying filter 300C to marked structure 200 in FIG. 2B. Again, for this embodiment, if the user marks an element on the schema level, all tables contained in the marked schema, i.e., all tables that extend from the schema, are visible. So, if a new table is added to a user-marked schema, the user can see and access the new unmarked table even with an activated filter. When a catalog is user-marked, all schemas contained therein are marked and visible. The user can see the content of a schema by a single "mouse-click".

As described above, catalog 206 is visible, because schema 262 of its lower hierarchic level is marked. The user hierarchical visibility marking of schema 262 has the additional effect that all of the tables contained in schema 262 are visible.

To visualize the preferences of the user in the lowest hierarchic level, table 262_4 of schema 262 is user-marked. The user hierarchical visibility marking of table 262_4 in schema 262 has no further effect on the marking and visibility of the other elements contained in schema 262. Finally, in schema 264 of catalog 206, tables 264_2 and 264_6 are user-marked. With user-marked tables 264_2, 264_6, corresponding schema 264 is visible too. The other tables of schema 264 are hidden as schema 264 itself is not user-marked, and the propagation of the visibility has no effects in the same hierarchic level. Hence, with filter 300C, if a user marks an element in database hierarchical directory structure, the mark is automatically propagated to the respective children and parent.

Figure 6A:
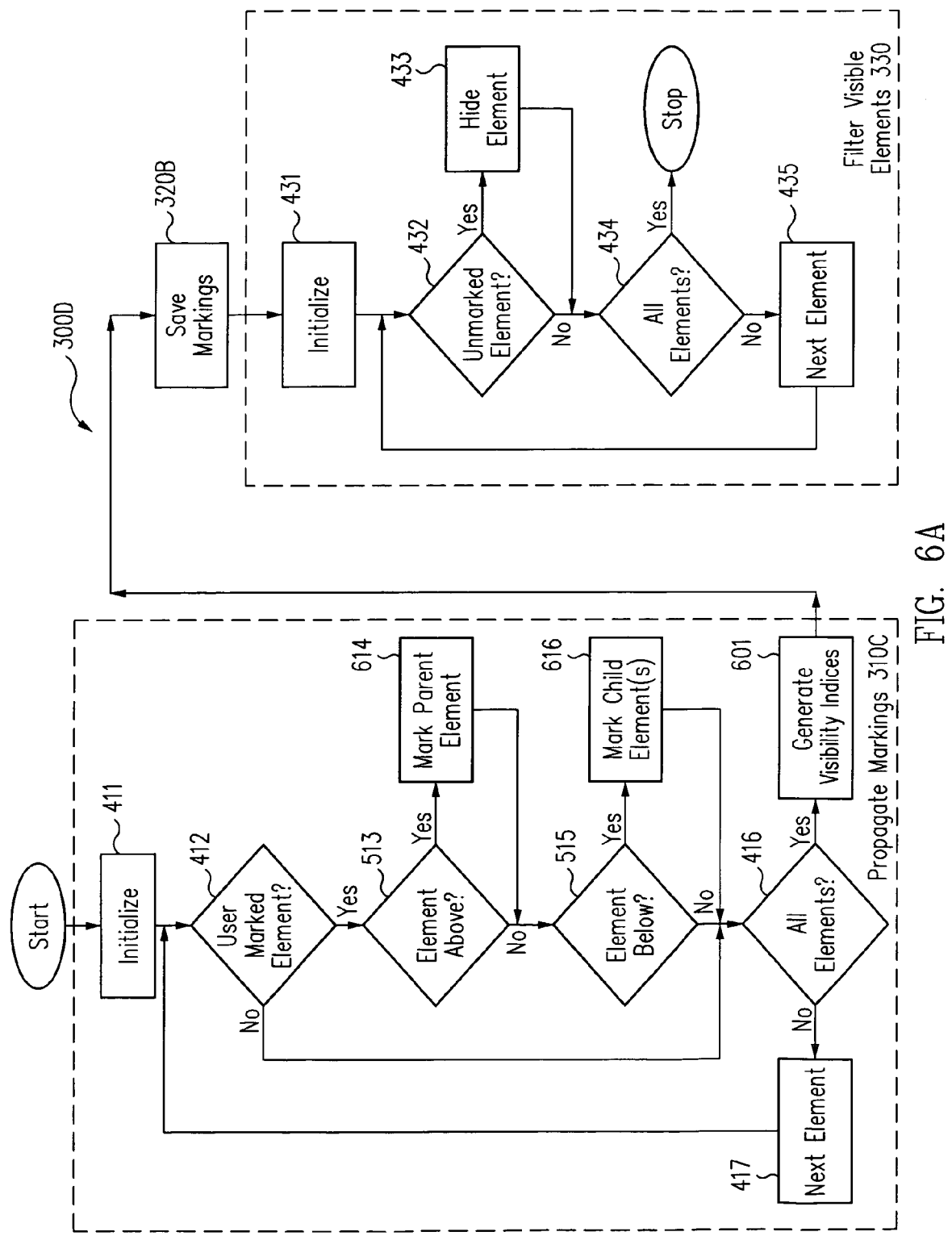
FIG. 6A is a process flow diagram for yet still another embodiment of the propagating visibility filter of the present invention.

FIG. 6A is a process flow diagram for another embodiment of a hide unmarked elements and display limited hierarchical structure filter 300D. Propagate markings operation 310C in filter 300D is similar to propagate markings operation 310B in filter 300C (FIG. 5A). However, mark parent element operation 514 and mark child element(s) operation 516 in operation 310B have been replaced by mark parent element operation 614 and mark child element(s) operation 616, respectively, in operation 310C. In addition, a generate visibility indices operation 601 has been added in the true branch of all elements check operation 416, and operation 601 transfers processing to save markings operation 320B.

In view of the similarity of operations 310B and 310C, only differences are described herein. Operation 614 includes all the features of operation 514 as described above. Similarly, operation 616 includes all the features of operation 516.

In addition for both operations 614 and 616, the display characteristics for container elements that are not user-marked and that do not contain any user-marked child elements are configured to indicate to the user upon display that the elements were made visible by action of the filter, i.e., the hierarchical visibility marking for the element is a propagated marking. In this embodiment in operation 616, if the child element is either user-marked or not user-marked and is in the lowest hierarchical level, the display characteristics for that element are configured to indicate to the user that the element was made visible by action of the filter.

The display characteristics, i.e., the propagated mark, used to indicate that an element is visible because the hierarchical visibility mark for that element was automatically propagated are selected to allow the user to easily differentiate between user-marked elements that are made visible based upon a user marking, and propagated elements that have been automatically made visible. For example, the top half of the displayed propagated element may be shaded. Alternatively, the fill in the displayed propagated element may be set to a color different from the default fill color of user-marked elements.

Generate visibility indices operation 601 determines for each container element that is user-marked, the number of elements in the next lower hierarchical level that are user-marked and the number of elements that are not used marked. The display characteristics of each user-marked container element are configured to include a user-marking indicator that upon display gives an indication of the number of marked and non-marked elements in that container element.

In one embodiment, the user-marking indicator is an area of a container element that is shaded in one direction, either vertical or horizontal, to indicate the percentage of user-marked elements in that container element. The unshaded area of the container element is the percentage of elements in the container that are not user-marked. Thus, the area of the container is used as a bar chart in this embodiment as the user-marking indicator. In general, the user-marking indicator can be any kind of diagrammatic indication such as a pie chart, a level chart, a color intensity, a depiction of the number of marked and unmarked elements, and the like.

Upon completion of operation 601, processing transfers to save markings operation 320B. Save markings operation 320B includes the operations of save markings operation 320A and that description is incorporated herein by reference. In addition, save markings operation 320B saves the user-marking indicator for each user-marked container.

Figure 6B:
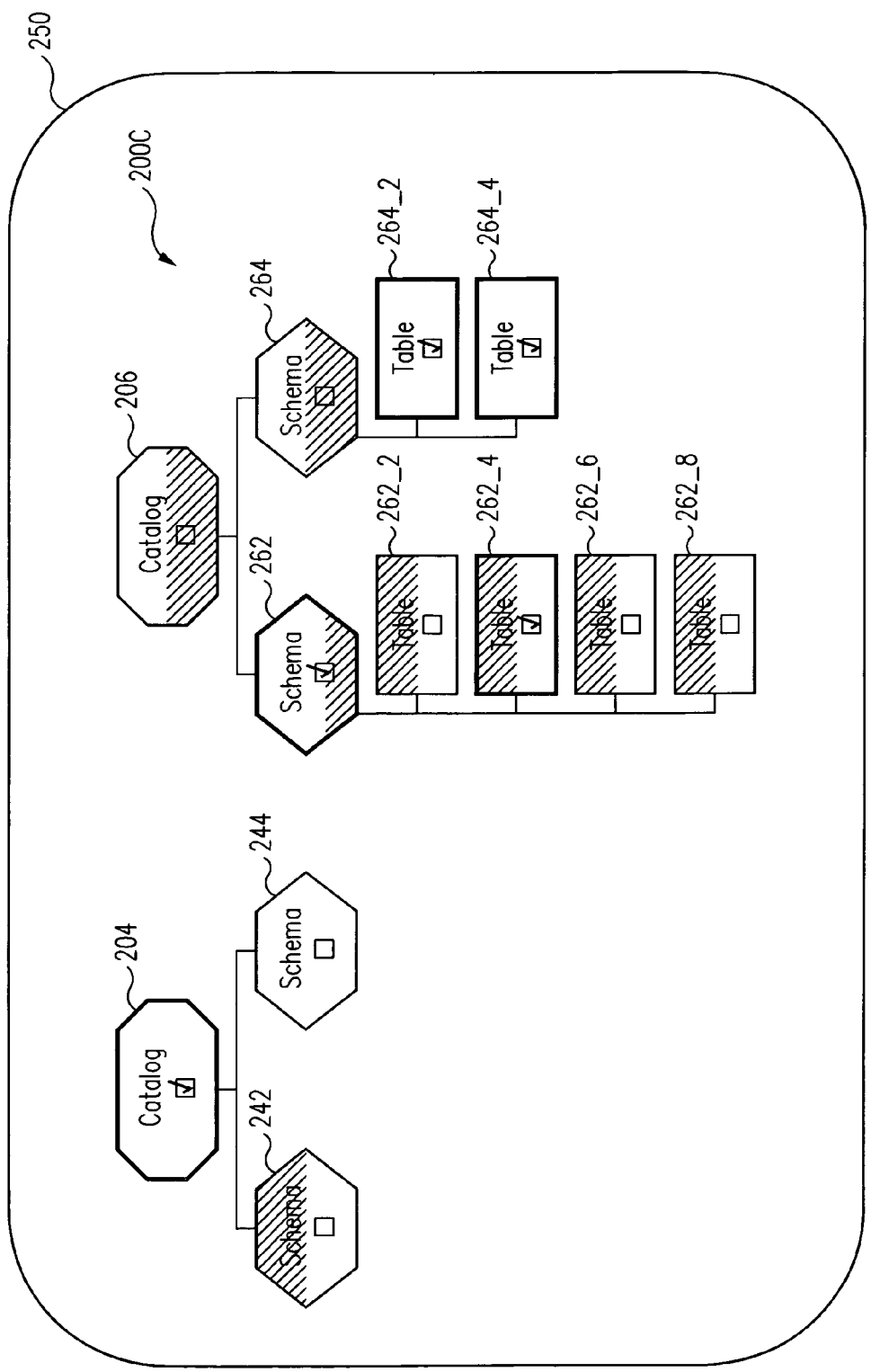
FIG. 6B is an illustration of a graphic user interface after the filter of FIG. 6A is applied to the data of FIG. 2B according to one embodiment of the present invention.

The result of applying filter 300D (FIG. 6A) to structure 200 (FIG. 2B) is structure 200C of FIG. 6B. Catalog 204 is user-marked and therefore is depicted bold. With the propagating visibility, both elements contained in catalog 204, schemas 242 and 244 are visible. Additionally, schema 242 and schema 244 are illustrated as children of a user-marked element with a propagated mark that is the gray upper part thereby marking the upper half of the element with a gray color. The children of both schemas 242, 244 are not visible and depicted as neither the children nor their parents, schemas 242, 244 are user-marked.

Catalog 206 was not marked by the user, but is visible as a parent of schema 262 that is user-marked. Half of the catalog 206 is marked by a user-marking indicator (the gray level in the background is in the lower half of the box) indicating that half of its children, schemas 262, 264, are user-marked.

Schema 262 of catalog 206 is user-marked. A quarter of the schema 62 is marked by a user-marking indicator (the gray level in the background) indicating that a quarter of its children, tables 262_2 to 262_8, are marked. Tables 262_2 to 262_8 of schema 262 are visible and marked by a propagated mark. Additionally, table 262_4 was user-marked and is therefore depicted in bold.

Schema 264 of catalog 206 is visible as two of its children, tables 264_2, 264_6, were user-marked. Half of the schema 264 is marked by a user-marking indicator (the gray level in the background) indicating that half of its children, tables 264_2, 264_4, 264_6, 264_8, are marked. Tables 264_2, 264_6 of schema 264 are visible as they were user-marked. Tables 264_4, 264_8 are not visible as they were not user-marked and their parent container, schema 64, was not user-marked.

The above embodiments for marking elements are illustrative only and are not intended to limit the invention to the specific embodiments described. For example, in view of this disclosure, those of skill in the art can vary the direction and the depth of the propagation arbitrarily without departing from the spirit and the scope of the present invention.

Figure 7A:
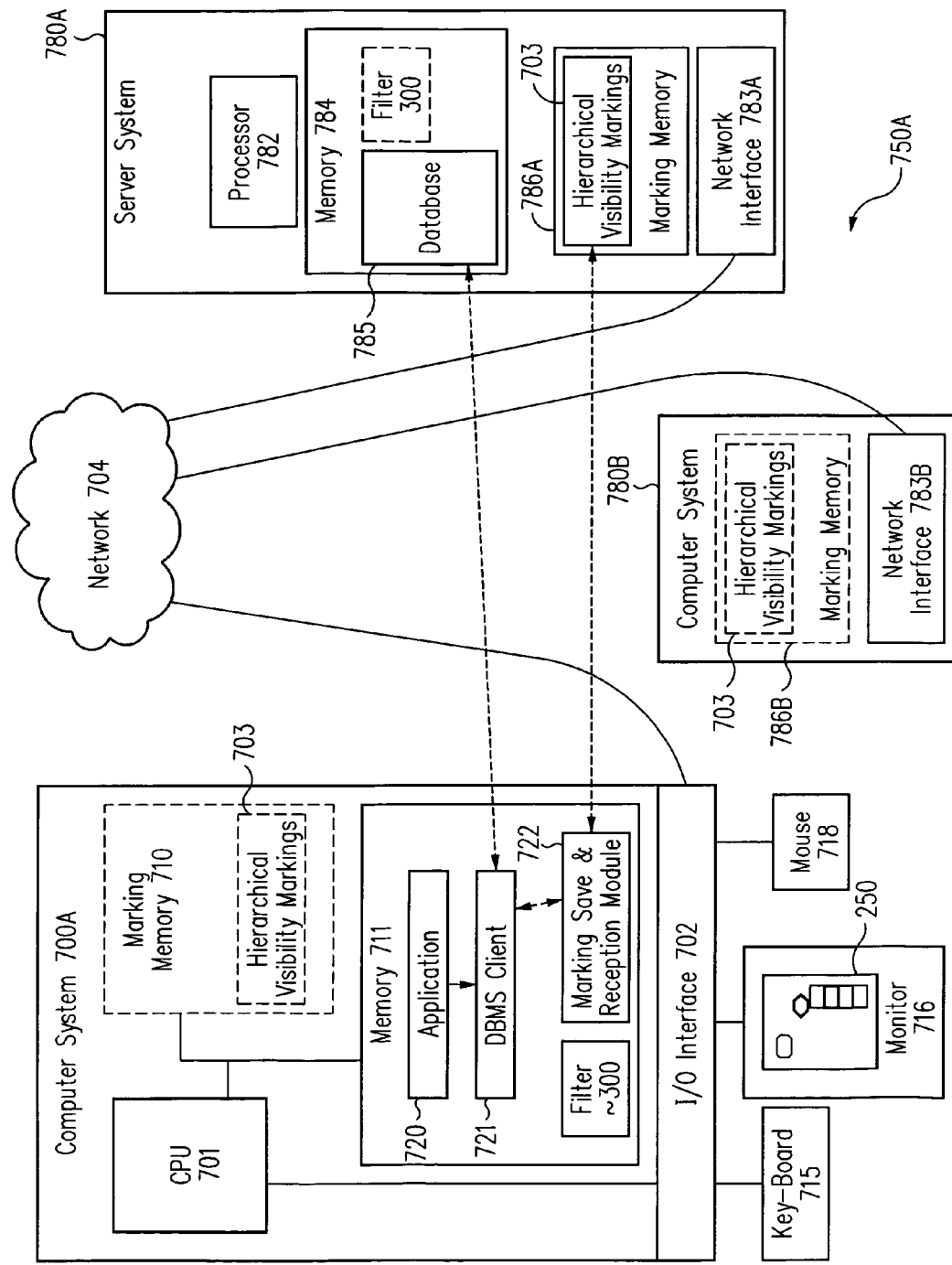
FIG. 7A is a block diagram of a computer network system that includes the methods and filter for the various embodiments of the present invention.

FIG. 7A is a block diagram of one embodiment of a system 750A in which various embodiments of this invention can be implemented. Application 730 and a client of a database management system 721 are stored in a memory 711 of computer system 700A and execute on CPU 701. Also, stored in memory 711 are filter module 310 that includes any combination of embodiments 310A to 310D and a marking and save reception module 722 that is used to store and retrieve hierarchical visibility markings 703.

Computer system 700A is coupled to network 704 through I/O interface 702. System 700A includes standard input devices like a keyboard 715 and a mouse 718, and output devices liked a printer (not shown), a display device 716 that includes display 250, or a speech processing means (not illustrated)

Server 780A is coupled via network interface 783A and network 704 to computer system 700A. Computer system 780B is coupled via network interface 783B and network 704 to computer system 700A.

The particular type of and configuration of computer system 700A, sometimes called client system 700A, is not essential to this embodiment of the present invention. The only requirement is that the client device be able to display the information described herein, and to issue input commands, as described herein. Similarly, network 704 can be any network or network system that is of interest to a user that couples computer system 700A to server system 780A.

Module 722 and 310 are illustrated as standing alone only for convenience. Module 722 and 310 should be capable of being called from application 720 and/or DBMS client 721 as needed. Moreover, those of skill in the art will understand that when it is said that a module or an operation takes some action, the action is the result of executing one or more instructions by a processor.

Figure 7B:
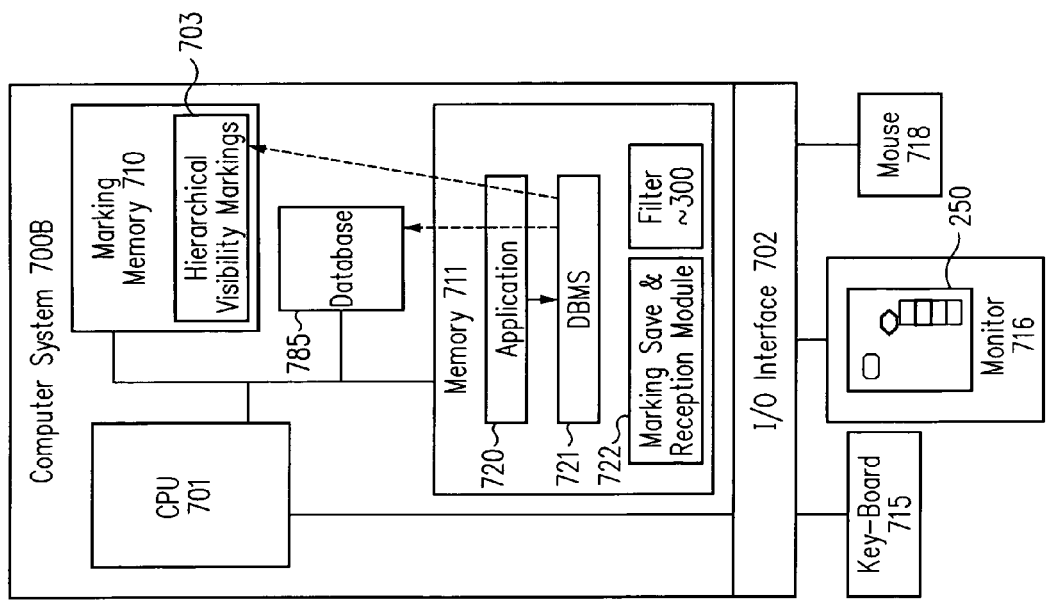
FIG. 7B is a block diagram of a stand-alone computer system that includes the methods and filter for the various embodiments of the present invention.

FIG. 7B is an example of one embodiment of the present invention implemented in a stand-alone computer system 700B. Elements in FIG. 7B with the same reference numeral as elements in FIG. 7A are the same or equivalent elements. The above comments with respect to FIG. 7A being illustrative only are directly applicable to FIG. 7B and are incorporated herein by reference.

Various alternative embodiments are possible using the various features of the invention alone or in combination. Accordingly, several process flow diagrams are considered below and the components in FIGS. 7A and 7B that are associated with a particular operation are included with the process flow diagram, as an example of a device used in or with the method.

Figure 8A:
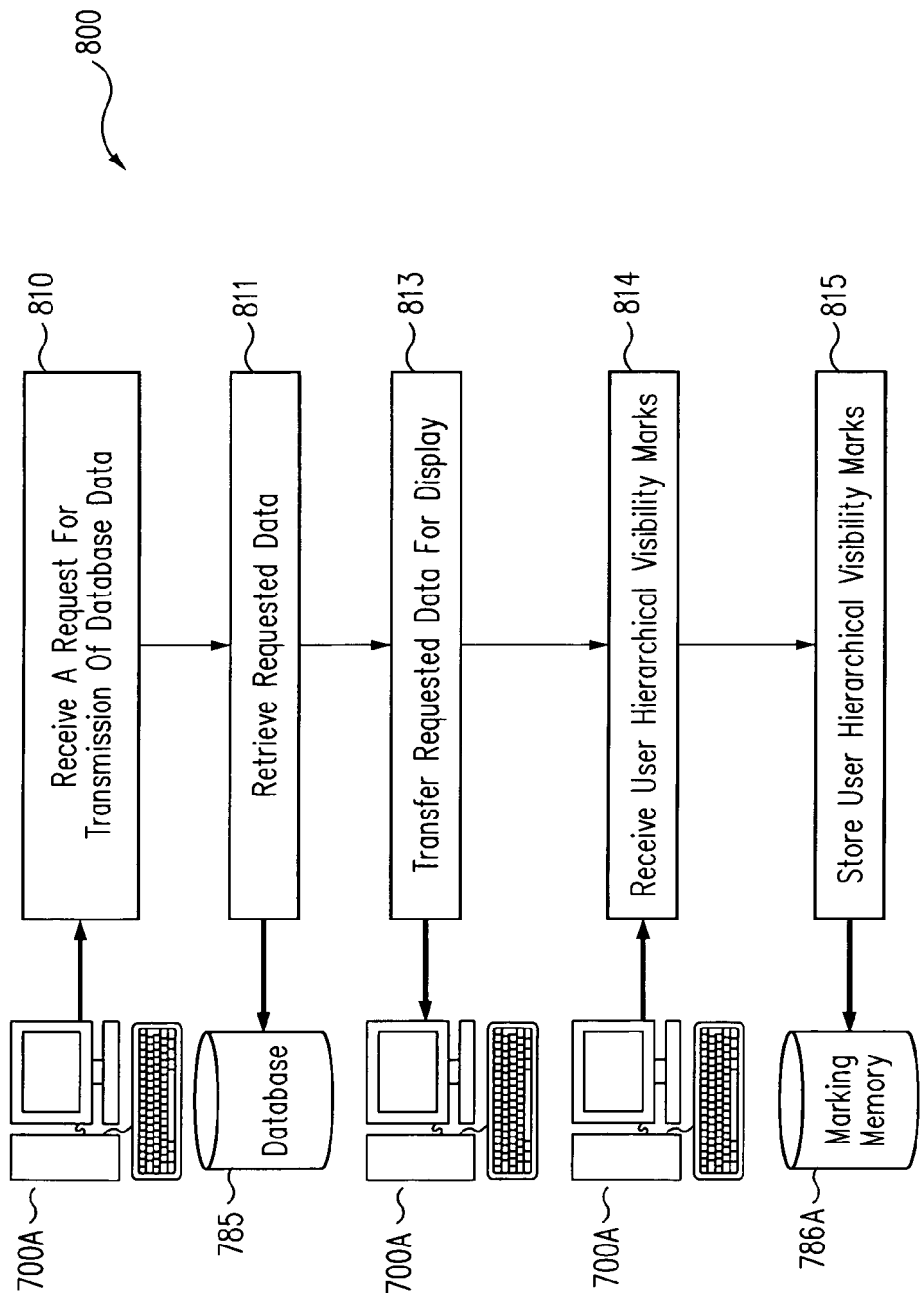
FIG. 8A is a process flow diagram for a method of saving the user hierarchical visibility marks according to one embodiment of the present invention.

In the above embodiments, it was assumed that hierarchical visibility markings 703 were saved by a module of filter 300. However, in another embodiment, hierarchical visibility markings 703 are saved without utilizing a filter. FIG. 8A is a process flow diagram for one embodiment of a method 800 for saving hierarchical visibility markings 703 with a database management system.

In receive request for transmission of database data operation 810, a user issues a request for database data using, for example, application 720 that in turn sends the request to DBMS client 721. DBMS client transmits the request over network 704 to a DBMS executing on server system 780A. Hence, in operation 810, the DBMS executing on server system 780A receives a data request from a user system 700A, sometimes called computer system 700A.

In retrieve requested data operation 811, the DBMS retrieves requested data from a database 785. The retrieved data are subsequently transferred from server 780A to user system 700A over network 704. Operations 810 to 813 are represented in FIG. 7A by the dotted line between DBMS client 721 and database 785.

In this embodiment, the data is a database hierarchical directory structure such as structure 200. The user applies user-marks to the hierarchical directory data structure and issues a request to save the user hierarchical visibility marks. This request is transferred to marking save and reception module 722 that in turn transmits the request and the user hierarchical visibility marks over network 704 to server system 780A.

Hence, in receive user hierarchical visibility marks operation 814, user system 700A transfers data together with user hierarchical visibility marks back to server 785 as the hierarchical visibility markings. In store user hierarchical visibility marks operation 815, the DBMS executing on server system 780A stores the hierarchical visibility markings 703 in a marking memory 786A. Alternatively, markings 703 are stored in memory 784. In yet another embodiment, markings 703 are stored in a memory 786B on another computer system 780B that can be accessed by server system 780A via network 704. The saving of hierarchical visibility markings 703 allows markings 703 to be retrieved for use.

As explained above, the hierarchical visibility markings 703 include at least the user hierarchical visibility marks, information to correlate the marks with the elements, and alternatively, information concerning the user. To prevent an expanded marking memory, the server may update the marking memory to delete marks of deleted data or deleted clients.

Figure 8B:
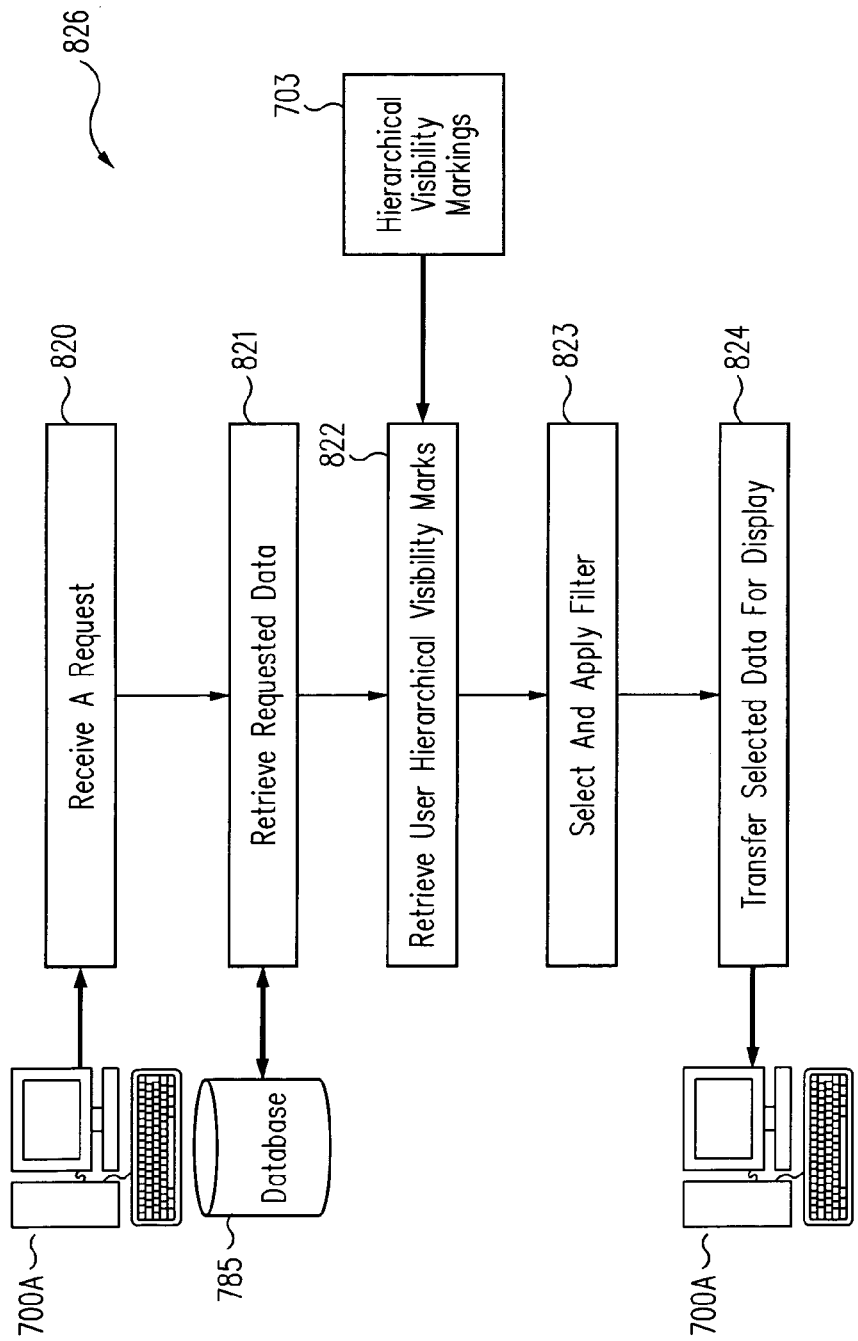
FIG. 8B is a process flow diagram for retrieving database data and user hierarchical visibility marks and using the two to select data for transfer for display according to one embodiment of the present invention.

FIG. 8B is a process flow diagram for a method 826 for using stored hierarchical visibility markings and a filter of this invention. In receive request operation 820, server system 780A (FIG. 7A) receives a request from user system 700A to retrieve data from database 785. In one embodiment, the request also specifies a filter to use in processing the requested data and the hierarchical visibility markings. Database 785 may be an internal or external database, which may be accessed via server system 780A.

In retrieve requested data operation 821, server system 780A retrieves the requested data from database 785 and then checks marking memory 786A for hierarchical visibility markings related to the requested data in retrieve user hierarchical visibility marks operation 822. If such hierarchical visibility markings are found, operation 822 retrieves the markings, e.g., retrieves hierarchical visibility markings 703 from marking memory 786A.

If the original request specified a filter, operation 823 uses that filter, and if not uses a default filter. In this embodiment, filter 300A that includes an embodiment of propagate markings module 310 and an embodiment of filter visible elements module 330 is used. Since hierarchical visibility markings 703 are already saved, module 320 is not needed. The filter is applied to the retrieved data using the retrieved user hierarchical visibility marks to generate the selected data. In transfer selected data for display operation 824, server system 780A transmits the selected data over network 704 to user system 700A for display on monitor 716. Note that since all the data is not transmitted, method 826 limits the load on network 704.

Various alternative embodiment of method 826 are possible. For example, the requested data and the user hierarchical visibility marks could be transferred to computer system 700A, sometimes called user system 700A or client system 700A, and the filtering and display could be carried out on client system 700A. Alternatively, the data and marks could be transferred to an intermediate computer system, the selected data generated and the selected data transmitted to user system 700A from the intermediate computer system.

Figure 8C:
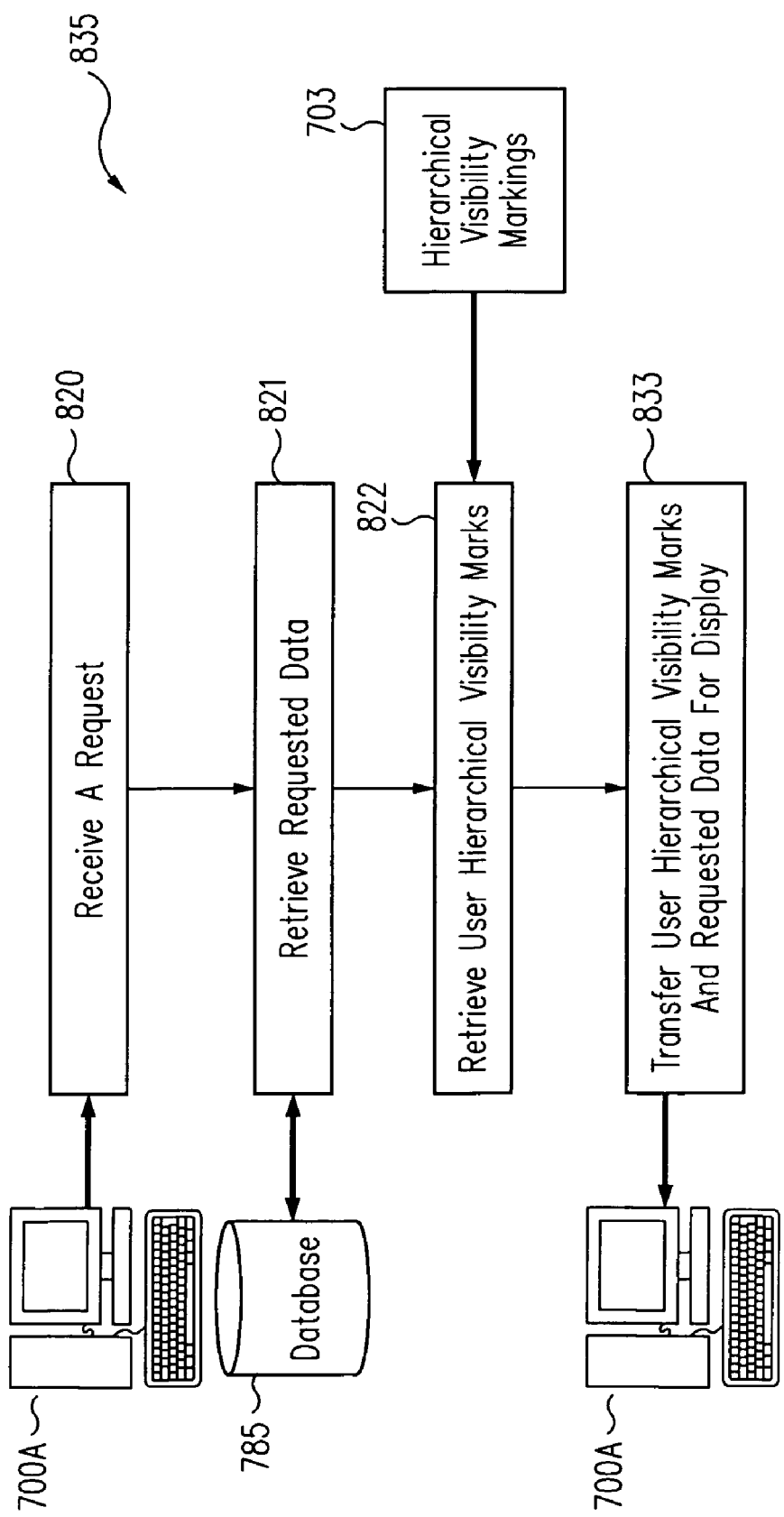
FIG. 8C is a process flow diagram for retrieving database data and user hierarchical visibility marks and transferring the two for display according to one embodiment of the present invention.

In method 835 (FIG. 8C), a filter is not applied to the retrieved data. Operations 820 to 822 in method 835 (FIG. 8C) are equivalent to operations 820 to 822 in method 826 (FIG. 8B) and that description of the operations is incorporated herein by reference. Operation 833 transfers the requested data and retrieved hierarchical visibility markings back to user system 700A for display. User system 700A generates structure 200 in display 250 (FIG. 2B), for example, with method 835.

While methods 800, 826 and 835 were described with respect to a client-server system 750A, each method can also be implemented on stand alone system 700B (FIG. 7B). The description of the methods is not repeated for system 700B, because in view of the above description, those of skill in the art can implement the methods on a stand-alone system and eliminate the network transmission of requests, responses and data.

Figure 9A:
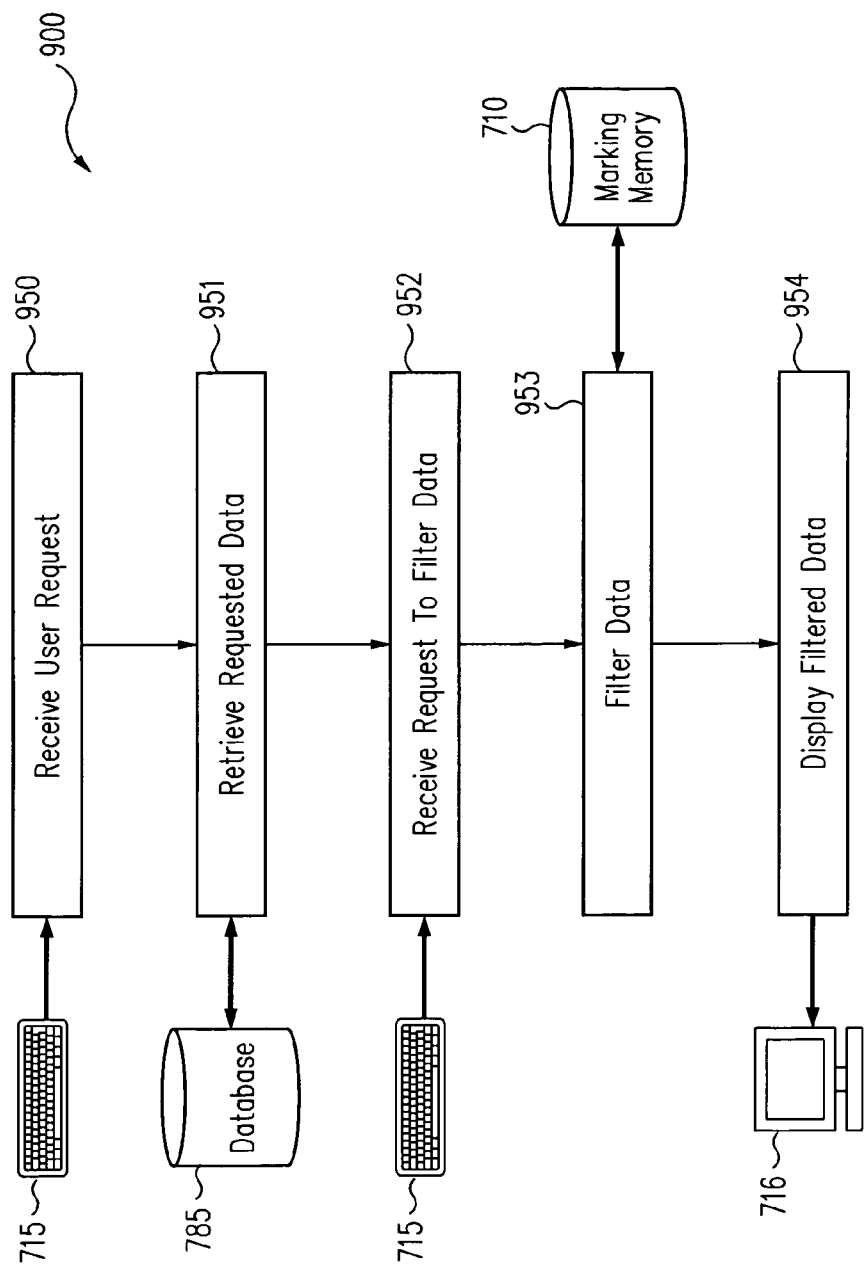
FIG. 9A is a process flow diagram for one embodiment of using the filters of this invention according to one embodiment of the invention.

A process flow diagram for method 900 is illustrated in FIG. 9A. Method 900, in this embodiment, is used with computer system 700B, and generates a sequence of displays such as those in FIGS. 2A, 2B, 4B, 5B, and 6B, for example.

In receive a request operation 950, a request is generated by a user via application 720, for example, for data. Operation 951 retrieves the requested data from database 785 and provides the data for display. See FIG. 2A. Database 785 can be on computer system 700B, or alternatively can be connected to computer system 700B by a network or some other type of connection for data communications.

The user applies user marks to various elements and those elements are highlighted as in FIG. 2B, for example. The user then issues a request to filter the data that is received by operation 952.

Filter data operation 953 applies the selected filter. See FIGS. 3A, 3B, 4A, 5A, and 6A for methods that can be executed in operation 953. Filter data operation 953 saves hierarchical visibility markings 703 in a memory. As explained above, the memory can be memory 711, marking memory 710, or alternatively a memory in another computer system that is coupled to system 700B. In one embodiment, markings 703 are stored as a part of database 785. After operation 953 is complete, operation 964 displays the filtered data on monitor 716.

Figure 9B:
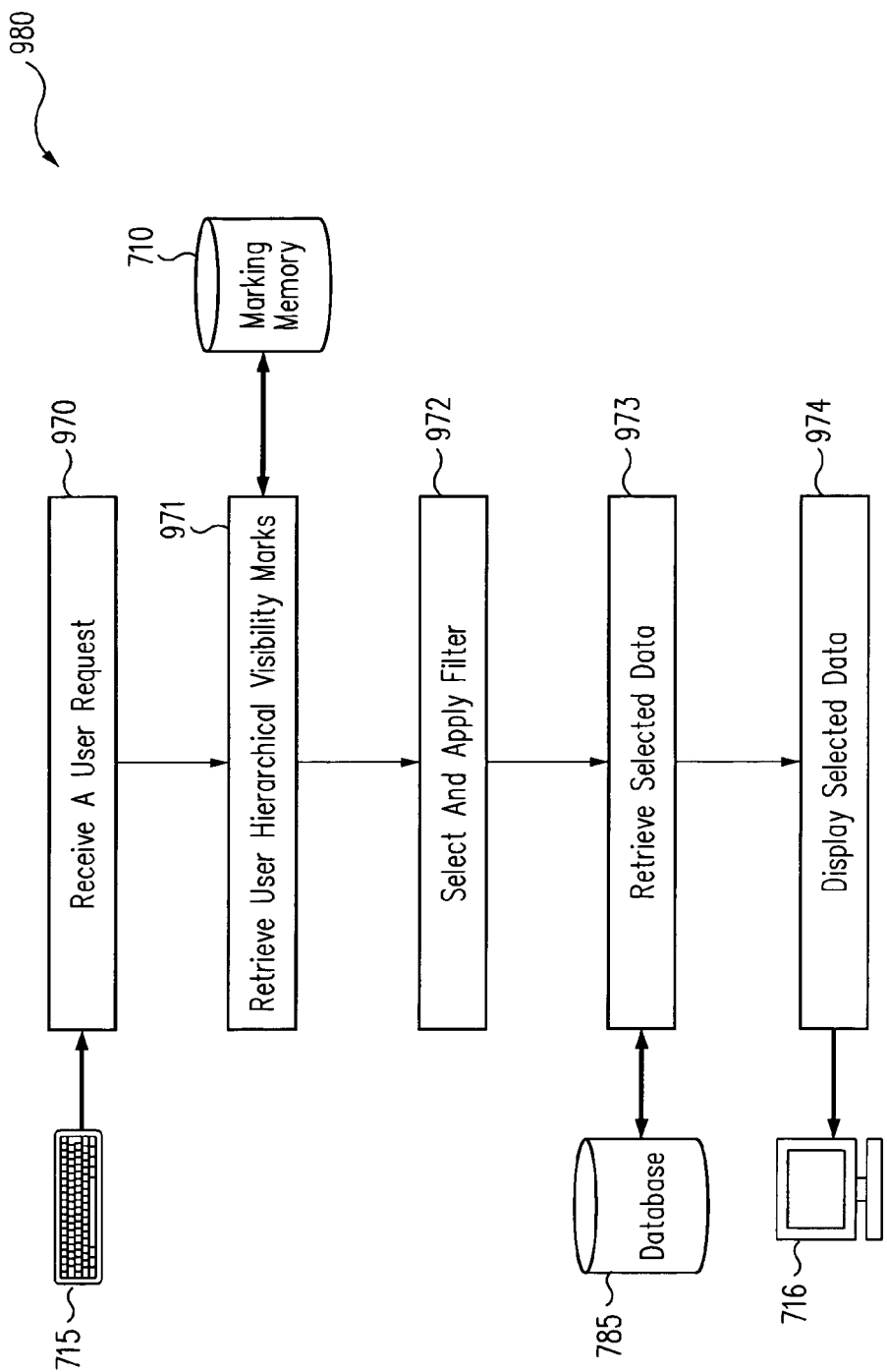
FIG. 9B is a process flow diagram for another embodiment of using the filters of this invention according to one embodiment of the invention.

FIG. 9B is a process flow diagram for yet another method 980 in which a user of computer system 700B uses the stored hierarchical visibility markings. In receive a user request operation 970, a request for retrieval of data is received that was issued using keyboard 715, for example.

In retrieve user hierarchical visibility marks operation 971, marking memory 710 is checked for hierarchical visibility markings related to the requested data. If such hierarchical visibility markings are found, operation 971 retrieves the markings, e.g., retrieves hierarchical visibility markings 703 from marking memory 710.

If the original request specified a filter, select and apply filter operation 972 uses that filter, and if not uses a default filter. In this embodiment, filter 300A that includes an embodiment of propagate markings module 310 and an embodiment of filter visible elements module 330 is used. Since hierarchical visibility markings 703 are already saved, module 320 is not needed. The filter is used with the user hierarchical visibility marks to define the selected data that needs to be retrieved.

Retrieve selected data operation 973 retrieves the selected data from database 785, and display selected data operation 974 displays the selected data on monitor 716. This embodiment reduces the access time to database 785 because only the selected data is retrieved.

It further should be mentioned that all of the above methods enable the user, the computer device and the client not only to retrieve data and marks, but also to change the marks and the data, and to store these changes.

In the various methods described above, to simplify the reception of the user hierarchical visibility marks, the marking memory, the database and a memory storing information about the users or client devices may be incorporated in a single database (not shown), on different tables interconnected by relations.

As the data of the database are usually retrieved by a database management system (DBMS), the data source uses relational algorithms between tables, as the DBMS stores the table structure e.g. in a directory table, and the marks in a related user specific marking table. The data source of the DBMS utilizes relational algebra to generate a user specific user interface. The DBMS user interface enables the user to access the tables stored in the database. The directory elements are marked in each hierarchic level in the directory by a user input. The user input can be a keyboard input, a mouse input and the like. In a last operation, the marks are stored in the database, to be automatically retrieved if the user accesses the database with a DBMS table access user interface next time.

Those skilled in the art readily recognize that in this embodiment the individual operations mentioned herein are performed by executing computer program instructions on a processor of a computer system. In one embodiment, a storage medium has thereon installed computer-readable program code for any or all of the methods and the alternative embodiments of the methods described herein, and execution of the computer-readable program code causes the processor to perform the individual operations explained above.

While in FIGS. 7A and 7B, the various memory units are illustrated as unified structures, this should not be interpreted as requiring that all memory in a particular structure or structures to be is at the same physical location. All or part of a memory structure can be in a different physical location than processor that uses the information stored on that memory structure. For example, program code for a method may be stored in memory that is physically located in a location different from the location of processor that executes all or part of that program code.

The processor should be coupled to the memory containing the program code for the method. This could be accomplished in a client-server system, or alternatively via a connection to another computer via modems and analog lines, or digital interfaces and a digital carrier line. For example, all of part of a memory structure could be in a World Wide Web portal, while the processor is in a personal computer, for example.

Herein, a computer program product includes a medium configured to store or transport computer readable code for any of all of the methods and various embodiments of the methods described herein or in which computer readable code for any or all of the methods is stored. Some examples of computer program products are CD-ROM discs, ROM cards, floppy discs, magnetic tapes, computer hard drives, and servers on a network.

Herein, a computer memory refers to a volatile memory, a non-volatile memory, or a combination of the two. Similarly, a computer input unit and a display unit refer to the features providing the required functionality to input the information described herein, and to display the information described herein, respectively, in any one of the aforementioned or equivalent devices.

In view of this disclosure, the various embodiments of the methods of this invention can be implemented in a wide variety of computer system configurations using an operating system and computer programming language of interest to the user. In addition, any method could be stored as different modules in memories of different devices. For example, a method could initially be stored in a server computer, and then as necessary, a module of the method could be transferred to a client device and executed on the client device. Consequently, part of the method would be executed on the server processor, and another part of the method would be executed on the processor of the client device.

Computer system 700A and/or computer system 700B, in one embodiment, can be a portable computer, a workstation, a two-way pager, a cellular telephone, a digital wireless telephone, a personal digital assistant, a server computer, an Internet appliance, or any other device that includes the components shown and that can provide the input commands, user marks, communication, and display handling functionality in accord with the embodiments of the invention as described herein. Similarly, in another embodiment, computer system 700A and/or 700B can be comprised of multiple different computers, wireless devices, cellular telephones, digital telephones, two-way pagers, or personal digital assistants, server computers, or any desired combination of these devices that are interconnected to perform, the methods as described herein.

Any or all of the embodiments of the methods of this invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, an embodiment of the invention also relates to a data carrier for storing a computer program for carrying out the embodiments of the inventive methods. Another embodiment of the invention relates to a method for using a computer system for carrying out the presented embodiments of inventive methods. Yet another embodiment of the invention relates to a computer system with a storage medium on which a computer program for carrying out the presented embodiments of the inventive methods is stored.

While the present invention has been described in connection with the embodiments thereof, it will be readily recognized by those skilled in the art that those embodiments are for exemplary purposes only without limiting the spirit and the scope of the present invention.

We claim:

1. A method comprising:
   receiving user hierarchical visibility marks for hierarchical elements in a database hierarchical structure,
      wherein said user hierarchical visibility marks are used to determine visibility of the hierarchical elements at various hierarchical levels in a display of said database hierarchical structure;
      said user hierarchical visibility marks were generated by a user marking any desired combination of said hierarchical elements, in said database hierarchical structure, for visibility in said display; and
      said user can arbitrarily select said combination of hierarchical elements; and
   propagating automatically hierarchical visibility marks to other hierarchical elements in said database hierarchical structure using said user hierarchical visibility marks for said hierarchical elements so that said other hierarchical elements have propagated hierarchical visibility marks wherein a user hierarchical visibility mark for a hierarchical element is propagated automatically to another hierarchical element that is in a hierarchy of said hierarchical element so that said another hierarchical element is one of said other hierarchical elements.

2. The method of claim 1 further comprising:
filtering hierarchical elements in said database hierarchical structure to hide any hierarchical element not having either a user hierarchical visibility mark or a propagated hierarchical visibility mark.

3. The method of claim 2 wherein said filtering is performed on a server system.

4. The method of claim 2 wherein said filtering is performed on a client system.

5. The method of claim 1 wherein said receiving and propagating are performed on a server system.

6. The method of claim 1 wherein said propagating automatically hierarchical visibility marks comprises:
propagating automatically hierarchical visibility marks to child elements contained in a container element having a user hierarchical visibility mark.

7. The method of claim 6 wherein said child elements are in a lowest hierarchical level of said database hierarchical structure.

8. The method claim 6 wherein said propagating automatically hierarchical visibility marks further comprises:
propagating automatically a hierarchical visibility mark to a parent element of said container element.

9. The method of claim 1 wherein said propagating automatically hierarchical visibility marks comprises:
propagating automatically a hierarchical visibility mark to a parent element of a hierarchical element having a user hierarchical visibility mark.

10. The method of claim 1 further comprising:
generating a user-marking indicator for a container element having at least one child element having a user hierarchical visibility mark.

11. A method for marking data elements in a database management system, said method comprising:
receiving a request for transmission of database data;
retrieving said requested database data;
transferring said requested database data for display;
receiving user hierarchical visibility marks for said requested data,
wherein said user hierarchical visibility marks are used to determine visibility of data elements in the database data at various hierarchical levels in said display of a database hierarchical structure;
said user hierarchical visibility marks result from a user marking any desired combination of the data elements, at various hierarchical levels of said database hierarchical structure, for visibility in said display; and
said user can arbitrarily select said the database data at various hierarchical levels for visibility; and
storing said user hierarchical visibility marks.

12. A method for selecting data in a database, said method comprising:
retrieving database data;
retrieving stored user hierarchical visibility marks for said database data,
wherein said user hierarchical visibility marks are used to determine visibility of the database data at various hierarchical levels in a display of a database hierarchical structure;
said user hierarchical visibility marks result from a user marking any desired combination of database data, in said database data at said various hierarchical levels, for said visibility in said display; and
said user can arbitrarily select said desired combination of database data in said database hierarchical structure; and
filtering said database data using said user hierarchical visibility marks to select certain data out of said database data.

13. The method of claim 12 further comprising:
transferring said selected data for display.

14. The method of claim 12 further comprising:
displaying said selected data.

15. The method of claim 12 further comprising:
receiving a request for transmission of said database data.

16. A method for selecting data in a database, said method comprising:
receiving a request for transmission of database data;
retrieving said database data;
retrieving stored user hierarchical visibility marks for said database data,
wherein said user hierarchical visibility marks are used to determine visibility of the database data at various hierarchical levels in a display of a database hierarchical structure;
said user hierarchical visibility marks result from a user marking any desired combination of database data, in said database data at said various hierarchical levels, for said visibility in said display; and
said user can arbitrarily select said desired combination of database data in said database hierarchical structure;
filtering said database data using said user hierarchical visibility marks to select certain data out of said database data; and
transferring said selected data for display.

17. A method for selecting data in a database, said method comprising:
receiving a request for transmission of database data;
retrieving said database data;
retrieving stored user hierarchical visibility marks for said database data,
wherein said user hierarchical visibility marks are used to determine visibility of the database data at various hierarchical levels in a display of a database hierarchical structure;
said user hierarchical visibility marks result from a user marking any desired combination of database data, in said database hierarchical structure for said various hierarchical levels, for said visibility in said display; and
said user can arbitrarily select said desired combination of database data in said database hierarchical structure; and
transferring said database data and said user hierarchical visibility marks for said display.

18. A database filter comprising:
a propagate markings module,
wherein said propagate markings module propagates a user hierarchical visibility mark for a hierarchical element in a first hierarchical level in a database hierarchical structure to a child element in a second hierarchical level in said database hierarchical, and further wherein said user hierarchical visibility mark is used to determine visibility of the hierarchical element in a display of said database hierarchical structure;

said user hierarchical visibility mark results from a user marking any desired hierarchical element in said database hierarchical structure; and said user can arbitrarily select user hierarchical visibility marks for any combination of hierarchical elements in said database hierarchical structure; and a filter visible elements module coupled to said propagate marking module.

19. A computer-program product comprising a storage medium having stored thereon computer readable code which, when executed on a computer processor, carries out a method comprising:

receiving user hierarchical visibility marks for hierarchical elements in a database hierarchical structure, wherein said user hierarchical visibility marks are used to determine visibility of the hierarchical elements at various hierarchical levels in a display of said database hierarchical structure;

said user hierarchical visibility marks were generated by a user marking any desired combination of said hierarchical elements, in said database hierarchical structure, for visibility in said display; and said user can arbitrarily select said combination of hierarchical elements; and propagating automatically hierarchical visibility marks to other hierarchical elements in said database hierarchical structure using said user hierarchical visibility marks for said hierarchical elements so that said other hierarchical elements have propagated hierarchical visibility marks wherein a user hierarchical visibility mark for a hierarchical element is propagated automatically to another hierarchical element that is in a hierarchy of said hierarchical element so that said another hierarchical element is one of said other hierarchical elements.

20. A computer system comprising:

means for receiving user hierarchical visibility marks for hierarchical elements in a database hierarchical structure, wherein said user hierarchical visibility marks are used to determine visibility of the hierarchical elements at various hierarchical levels in a display of said database hierarchical structure;

said user hierarchical visibility marks were generated by a user marking any desired combination of said hierarchical elements, in said database hierarchical structure, for visibility in said display; and said user can arbitrarily select said combination of hierarchical elements; and means for propagating automatically hierarchical visibility marks to other hierarchical elements in said database hierarchical structure using said user hierarchical visibility marks for said hierarchical elements so that said other hierarchical elements have propagated hierarchical visibility marks wherein a user hierarchical visibility mark for a hierarchical element is propagated automatically to another hierarchical element that is in a hierarchy of said hierarchical element so that said another hierarchical element is one of said other hierarchical elements.

21. The computer system of claim 20 further comprising:

means for filtering hierarchical elements in said database hierarchical structure to hide any hierarchical element not having either a user hierarchical visibility mark or a propagated hierarchical visibility mark.

22. A computer system comprising:

a processor; and a memory coupled to said processor having stored therein executable instructions wherein execution of said executable instructions on said processor generates a method comprising:

receiving user hierarchical visibility marks for hierarchical elements in a database hierarchical structure, wherein said user hierarchical visibility marks are used to determine visibility of the hierarchical elements at various hierarchical levels in a display of said database hierarchical structure;

said user hierarchical visibility marks were generated by a user marking any desired combination of said hierarchical elements, in said database hierarchical structure, for visibility in said display; and said user can arbitrarily select said combination of hierarchical elements;

propagating automatically hierarchical visibility marks to other hierarchical elements in said database hierarchical structure using said user hierarchical visibility marks for said hierarchical elements so that said other hierarchical elements have propagated hierarchical visibility marks wherein a user hierarchical visibility mark for a hierarchical element is propagated automatically to another hierarchical element that is in a hierarchy of said hierarchical element so that said another hierarchical element is one of said other hierarchical; and filtering hierarchical elements in said database hierarchical structure to hide any hierarchical element not having either a user hierarchical visibility mark or a propagated hierarchical visibility mark.

* * * * *

UNITED STATES PATENT AND TRADEMARK OFFICE
CERTIFICATE OF CORRECTION

| | |
|---|---|
| PATENT NO. | : 7,162,484 B2 |
| APPLICATION NO. | : 10/261978 |
| DATED | : January 9, 2007 |
| INVENTOR(S) | : Dirk Grobler, Ocke Janssen and Frank Schoenheit |

It is certified that error appears in the above-identified patent and that said Letters Patent is hereby corrected as shown below:

Column 22, Line 43, Claim 22, after "said other hierarchical", insert --elements--.

Signed and Sealed this

Twenty-seventh Day of March, 2007

JON W. DUDAS
*Director of the United States Patent and Trademark Office*